United States Patent
Napau et al.

(10) Patent No.: US 8,382,057 B2
(45) Date of Patent: Feb. 26, 2013

(54) LOW PROFILE SEAT TRACK SYSTEM

(75) Inventors: Mircea Napau, Sterling Heights, MI (US); Ioan Napau, Troy, MI (US); Dean Lenane, Birmingham, AL (US); Robert James Bachula, Macomb, MI (US); Tobias Keller, Grosse Pointe Woods, MI (US); Patrick Frank Timmerman, Howell, MI (US)

(73) Assignee: CRH North America, Inc., Warren, MI (US)

( * ) Notice: Subject to any disclaimer, the term of this patent is extended or adjusted under 35 U.S.C. 154(b) by 162 days.

(21) Appl. No.: 12/798,205

(22) Filed: Mar. 31, 2010

(65) Prior Publication Data

US 2011/0240820 A1 Oct. 6, 2011

(51) Int. Cl.
*F16M 13/00* (2006.01)

(52) U.S. Cl. ........ 248/423; 248/429; 248/424; 248/430; 297/344.11; 74/527

(58) Field of Classification Search .................. 248/429, 248/424, 430, 419; 296/65.14; 297/344.1, 297/344.11, 341; 74/527, 535
See application file for complete search history.

(56) References Cited

U.S. PATENT DOCUMENTS

| | | | | |
|---|---|---|---|---|
| 5,234,189 A * | 8/1993 | Myers | ............................. | 248/429 |
| 5,816,110 A * | 10/1998 | Schuler et al. | ................... | 74/527 |
| 5,931,436 A * | 8/1999 | Rohee | ............................ | 248/430 |
| 5,961,088 A * | 10/1999 | Chabanne et al. | ............. | 248/429 |
| 6,637,712 B1 * | 10/2003 | Lagerweij | ...................... | 248/429 |
| 6,669,284 B2 * | 12/2003 | Feichtinger et al. | ...... | 297/216.18 |
| 6,874,747 B2 * | 4/2005 | Oh | ................................. | 248/430 |
| 7,191,995 B2 * | 3/2007 | Kim | .............................. | 248/429 |
| 7,600,816 B2 * | 10/2009 | Bauersachs et al. | .......... | 297/341 |
| 7,661,646 B2 * | 2/2010 | Weber | ........................... | 248/429 |
| 7,669,825 B2 * | 3/2010 | Sung | .............................. | 248/429 |
| 7,931,246 B2 * | 4/2011 | Brewer et al. | ................. | 248/429 |
| 7,980,525 B2 * | 7/2011 | Kostin | ........................... | 248/429 |
| 8,029,063 B2 * | 10/2011 | Kazyak et al. | ............. | 297/344.1 |
| 2003/0006355 A1 * | 1/2003 | Horsfield et al. | ............. | 248/429 |
| 2008/0308704 A1 * | 12/2008 | Kostin | ........................ | 248/503.1 |
| 2008/0315662 A1 * | 12/2008 | Suck et al. | .................. | 297/463.1 |
| 2009/0134681 A1 * | 5/2009 | Quast et al. | ................... | 297/341 |

FOREIGN PATENT DOCUMENTS

| | | |
|---|---|---|
| DE | 43 30 870 C1 | 9/1994 |
| DE | 198 11 094 A1 | 10/1999 |
| DE | 198 11 094 C2 | 1/2002 |
| DE | 10 2004 003 144 A1 | 11/2004 |
| DE | 102 62 182 B4 | 10/2006 |
| DE | 10 2006 047 525 A1 | 5/2007 |
| EP | 0 408 932 A2 | 1/1991 |
| EP | 0 962 356 A2 | 12/1999 |
| EP | 1 316 465 A1 | 6/2003 |

(Continued)

*Primary Examiner* — Terrell McKinnon
*Assistant Examiner* — Daniel J Breslin
(74) *Attorney, Agent, or Firm* — Bliss McGlynn, P.C.

(57) ABSTRACT

A seat track system for a seat of a vehicle includes at least one seat track having a lower track member adapted to be fixed to a vehicle structure and an upper track member adapted to be connected to a seat and moveable relative to the lower track member. The seat track system also includes a manual positive engagement locking system cooperating with the at least one seat track to allow longitudinal adjustment of the upper track member relative to the lower track member and to positively engage the at least one seat track such that a locking element does extend through the locking plate but does not extend below the lower track member.

18 Claims, 23 Drawing Sheets

FOREIGN PATENT DOCUMENTS

| | | |
|---|---|---|
| FR | 2 395 858 | 1/1979 |
| FR | 2 755 654 | 5/1998 |
| FR | 2 852 896 | 10/2004 |
| FR | 2 901 193 | 11/2007 |
| WO | WO 95/17317 | 6/1995 |
| WO | WO 96/11123 | 4/1996 |
| WO | WO 99/08892 | 2/1999 |

* cited by examiner

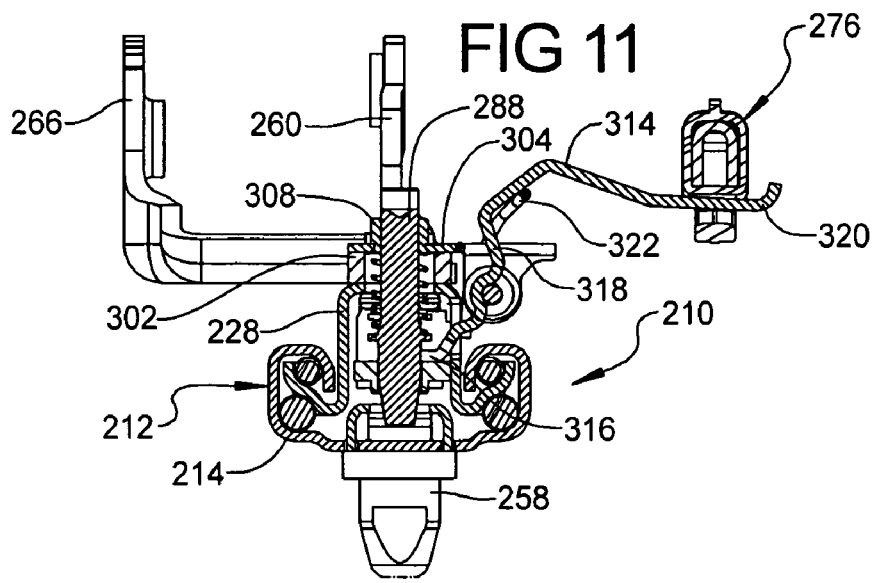
FIG 11
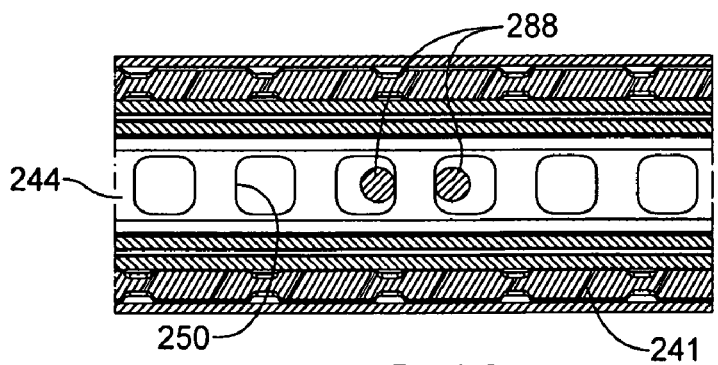
FIG 12
FIG 13

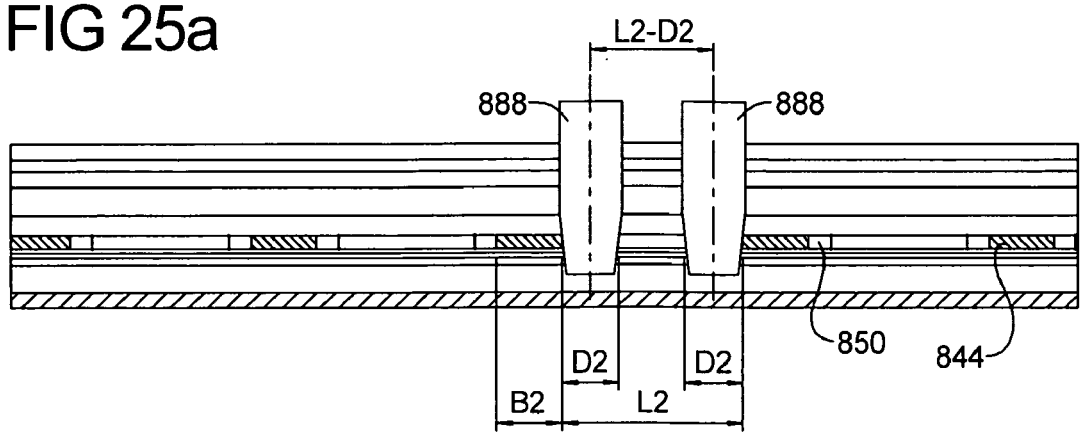
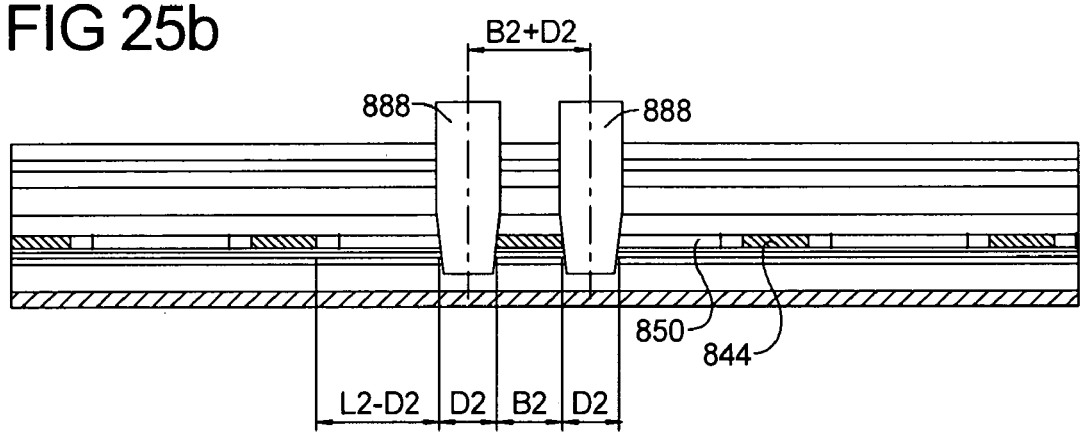
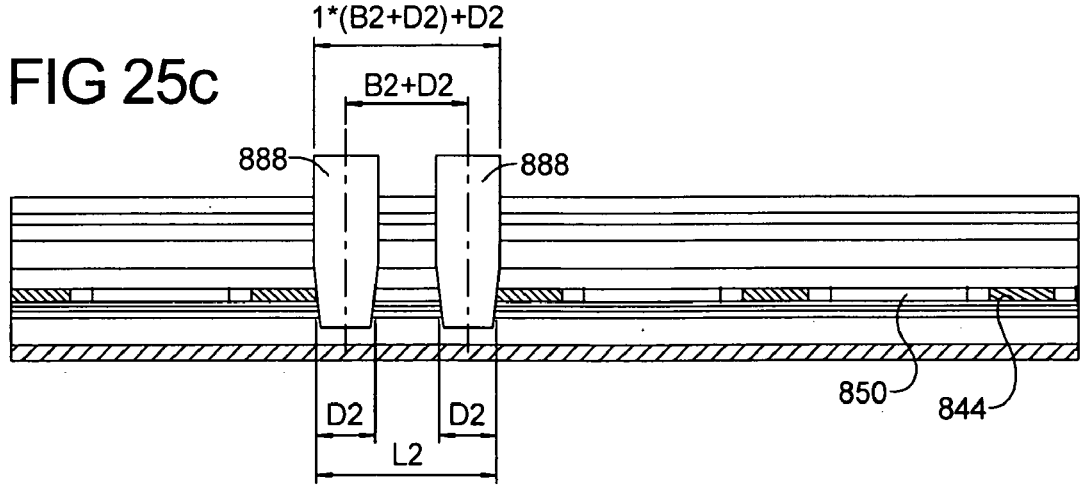

FIG 28a
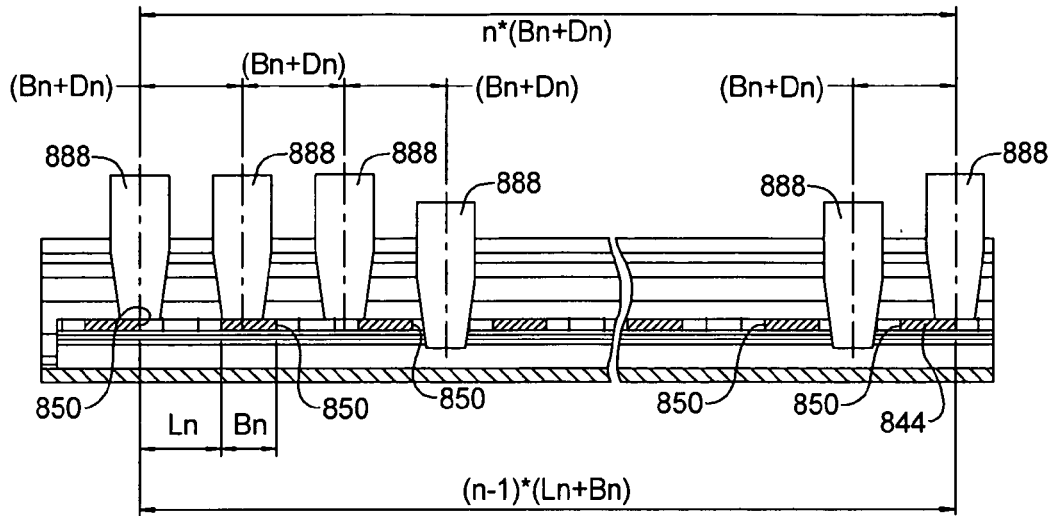
FIG 28b
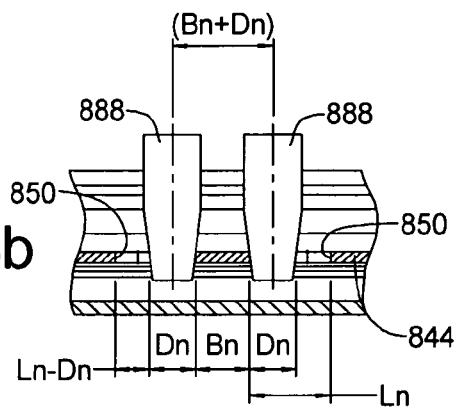
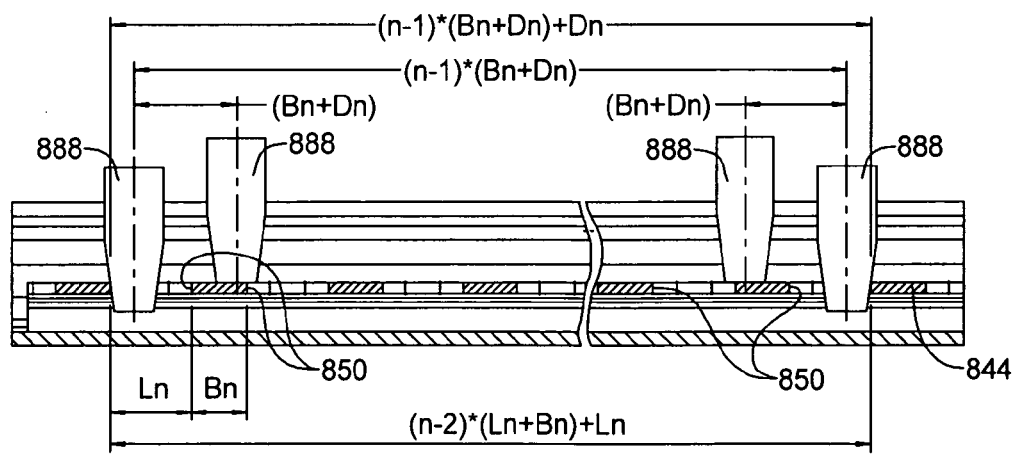
FIG 28c

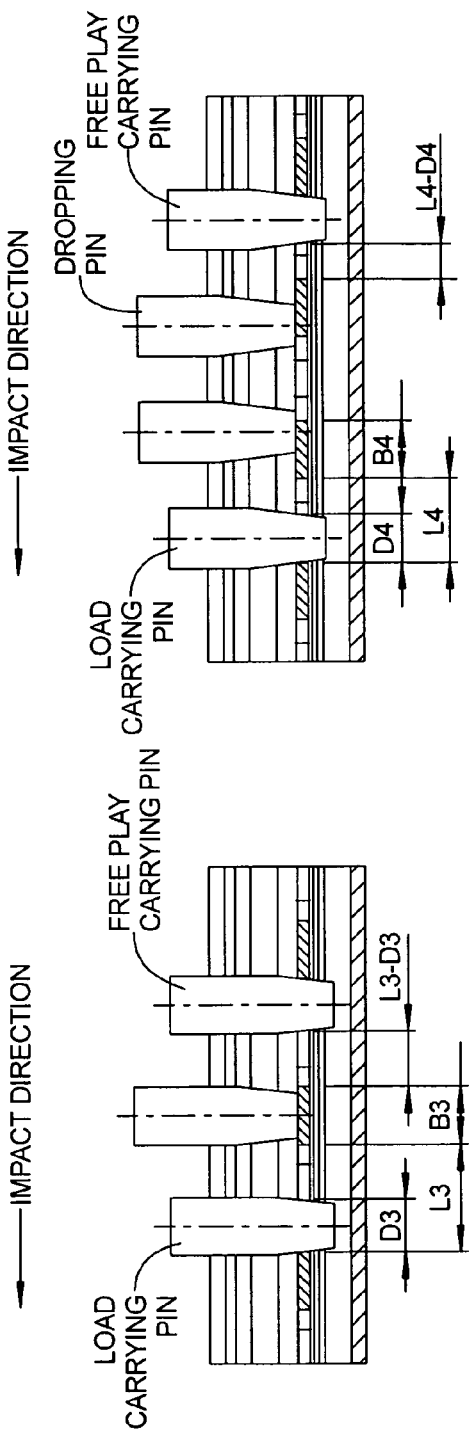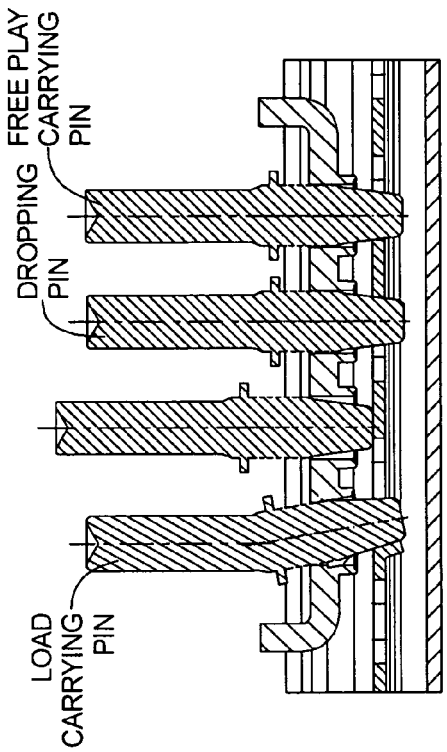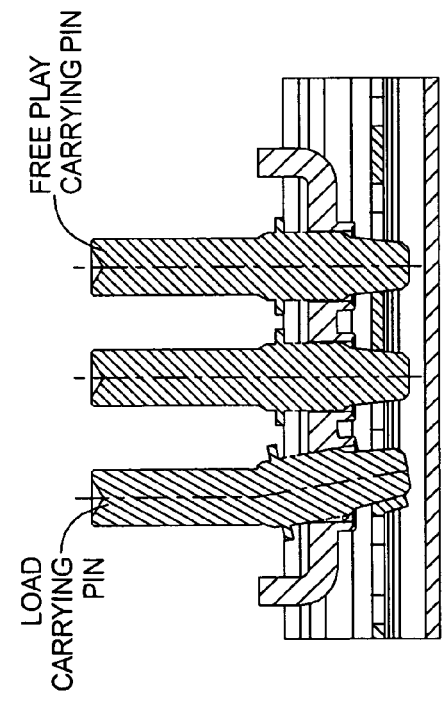
FIG 29a
FIG 29b
FIG 30a
FIG 30b

LOW PROFILE SEAT TRACK SYSTEM

BACKGROUND OF THE INVENTION

1. Field of the Invention

The present invention relates generally to seats for vehicles and, more specifically, to a seat track system with a low profile track and manual positive engagement locking mechanism for a seat of an automotive vehicle.

2. Description of the Related Art

It is known to provide a seat for a vehicle such as an automotive vehicle. Typically, the seat includes a generally horizontal seat portion and a generally vertical back portion operatively connected to the seat portion. The seat may include at least one, preferably a pair of tracks to allow horizontal adjustment of the seat portion and a pivoting mechanism to allow vertical adjustment of the seat portion. The tracks are spaced laterally and extend longitudinally and are secured to vehicle structure such as a seat riser by suitable means such as fasteners. The tracks are steel, rolled sections with a fixed lower track member and a sliding upper track member. The tracks may be longitudinally adjusted manually or by power. The longitudinal adjustment of the vehicle seat, in some applications, must include positive or continuous engagement in any position with the track to prevent longitudinal movement of the seat during a vehicle impact.

Therefore, it is desirable to provide a seat track system for a seat of a vehicle that provides a positive engagement to prevent movement of the seat once it is adjusted. It is also desirable to provide a seat track system for a seat of a vehicle that has a very low track profile. It is further desirable to provide a seat track system for a seat of a vehicle that has a positive engagement locking mechanism capable of operating in a very low track profile. Thus, there is a need in the art to provide a seat track system that meets at least one of these desires.

SUMMARY OF THE INVENTION

It is, therefore, one object of the present invention to provide a new seat track system for a seat of a vehicle.

It is another object of the present invention to provide a low profile track in a seat track system for a seat of a vehicle.

It is yet another object of the present invention to provide a positive engagement locking system for a seat track system for a seat of a vehicle.

It is still another object of the present invention to provide a locking mechanism for a seat track system which can lock up at any arbitrary seat slide position with minimal play between locking elements and lock apertures provided in a locking member.

To achieve one or more of the foregoing objects, the present invention is a manual positive engagement locking mechanism for a seat track system for a seat of a vehicle. The manual positive engagement locking mechanism includes a locking member disposed between a lower track member adapted to be fixed to a vehicle structure and an upper track member adapted to be connected to a seat and moveable relative to the lower track member. The manual positive engagement locking mechanism also includes at least one movable locking element selectively engagable and disengageable with the locking member to allow a position of the seat to be adjusted longitudinally and to prevent the position of the seat from moving once the position has been adjusted.

The present invention is also a low profile seat track for a seat of a vehicle. The low profile seat track includes a lower track member adapted to be fixed to a vehicle structure and an upper track member adapted to be connected to a seat and moveable relative to the lower track member. The lower track member has a general U shape with outer flanges extending downwardly. The upper track member has a general U shape with inner flanges extending upwardly such that the outer flanges overlap the inner flanges to give the seat track a vertical height less than 30 millimeters.

Additionally, the present invention is a seat track system for a seat of a vehicle. The seat track system includes at least one seat track having a lower track member adapted to be fixed to a vehicle structure and an upper track member adapted to be connected to a seat and moveable relative to the lower track member. The seat track system also includes a manual positive engagement locking system cooperating with the at least one seat track to allow longitudinal adjustment of the upper track member relative to the lower track member and to positively engage the at least one seat track such that a locking element does extend through the lower track member.

One advantage of the present invention is that a new seat track system is provided for a seat of a vehicle that prevents longitudinal movement of the seat after adjustment. Another advantage of the present invention is that the seat track system prevents longitudinal movement of the seat once adjusted by positive engagement. Yet another advantage of the present invention is that the seat track system has a mechanical positive engagement locking system that prevents longitudinal movement once the seat is adjusted. Still another advantage of the present invention is that the seat track system has a seat track with a very low track profile. Yet a further advantage of the present invention is that the seat track system has a positive engagement locking mechanism capable of operating in a very low track profile. Still a further advantage of the present invention is that the seat track system has a locking mechanism that can lock up at any arbitrary seat slide position with minimal play between locking pins and the lock apertures provided in a locking member.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1*a* is a perspective view of the seat track system of FIG. 1.

FIG. 11 is a sectional view of a portion of the seat track system of FIG. 8.

FIG. 12 is a fragmentary side view of a portion of the seat track system of FIG. 8.

FIG. 13 is a fragmentary plan view of a portion of the seat track system of FIG. 8.

FIGS. 25a-c are fragmentary sectional views of a portion of the seat track system, according to the present invention, illustrated with two locking pins.

FIGS. 28a-c are fragmentary sectional views of a portion of the seat track system, according to the present invention, illustrated with n locking pins.

FIGS. 29a-c are fragmentary and graphic views of pin load force variation function of travel adjustment for the seat track system of FIG. 16, illustrated with three locking pins.

FIGS. 30a-c are fragmentary and graphic views of pin load force variation function of travel adjustment for the seat track system of FIG. 22, illustrated with four locking pins.

DESCRIPTION OF THE PREFERRED EMBODIMENT(S)

Figure 1:
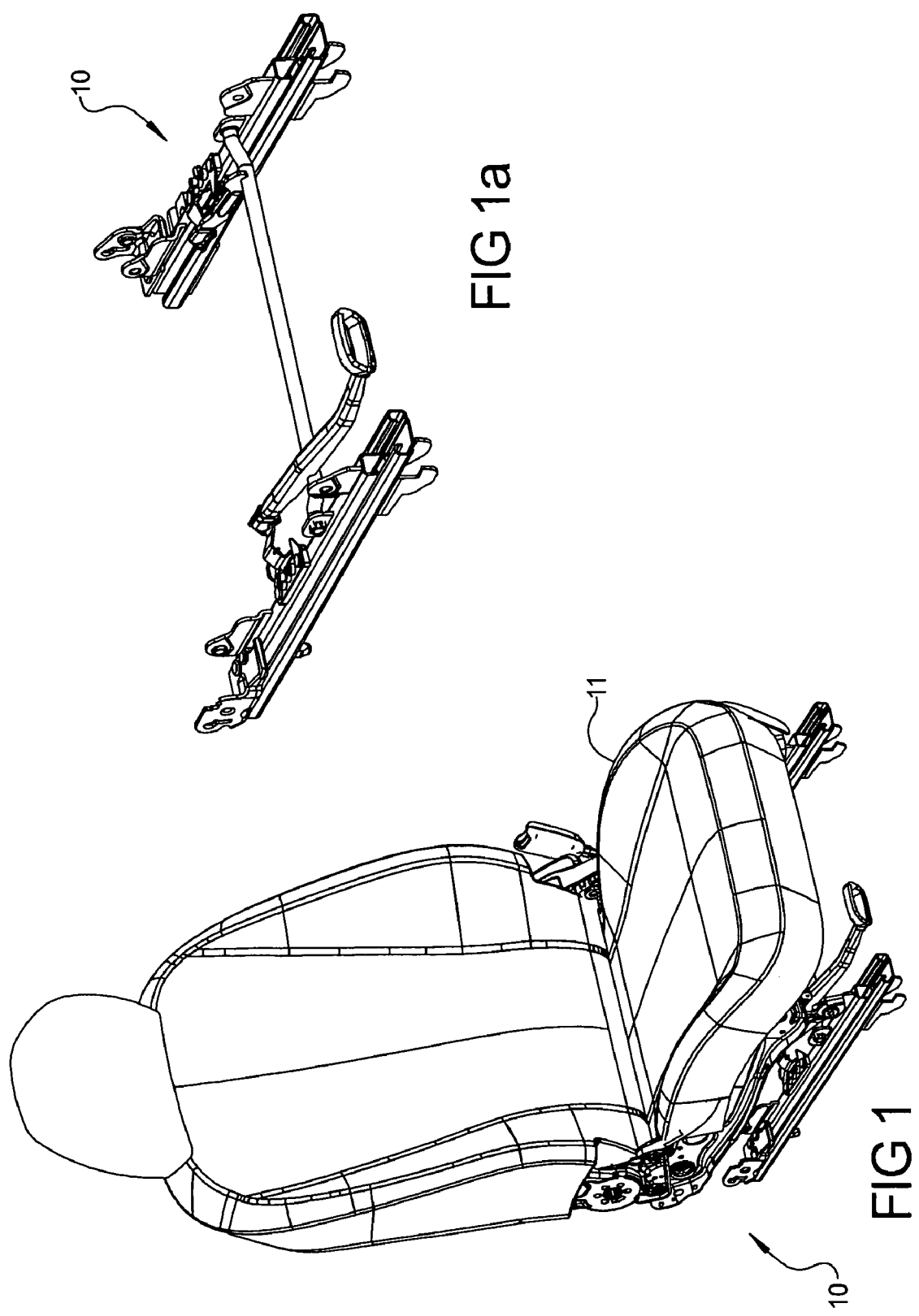
FIG. 1 is a perspective view of a seat track system, according to the present invention, illustrated in operational relationship with a seat of a vehicle.
Figure 2:
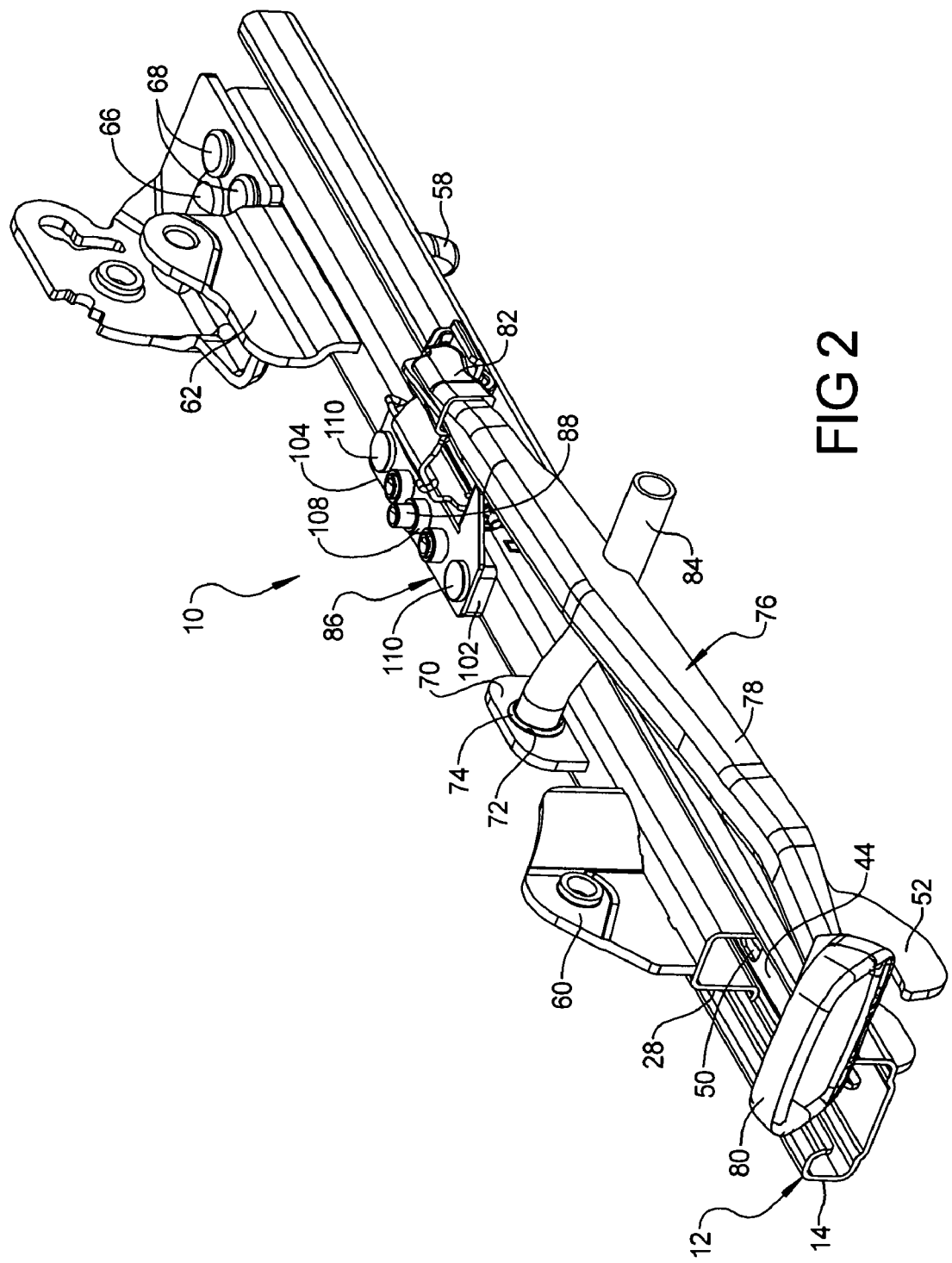
FIG. 2 is a perspective view of a portion of the seat track system of FIGS. 1 and 1*a*.
Figure 3:
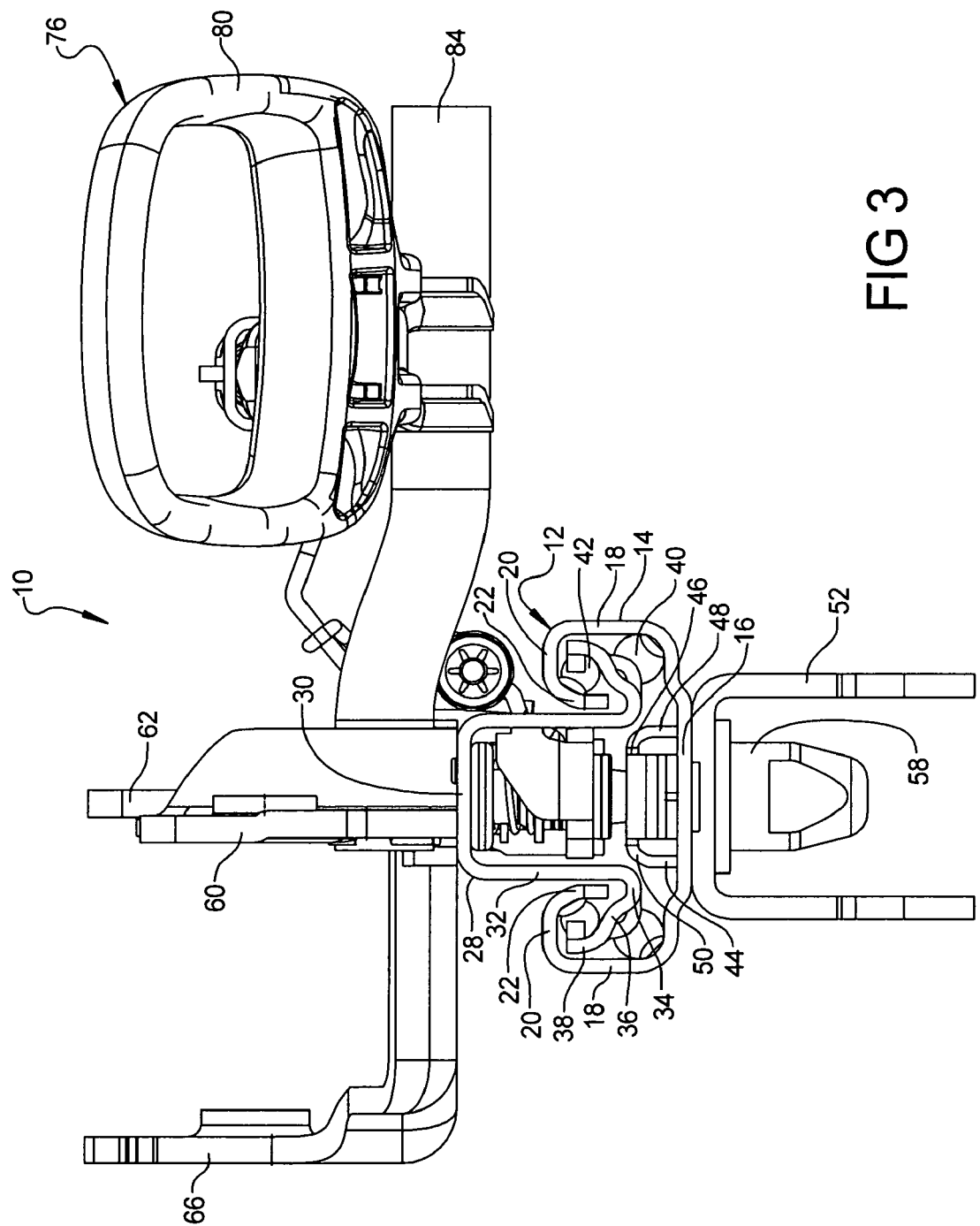
FIG. 3 is a front view of the seat track system of FIG. 2.
Figure 4:
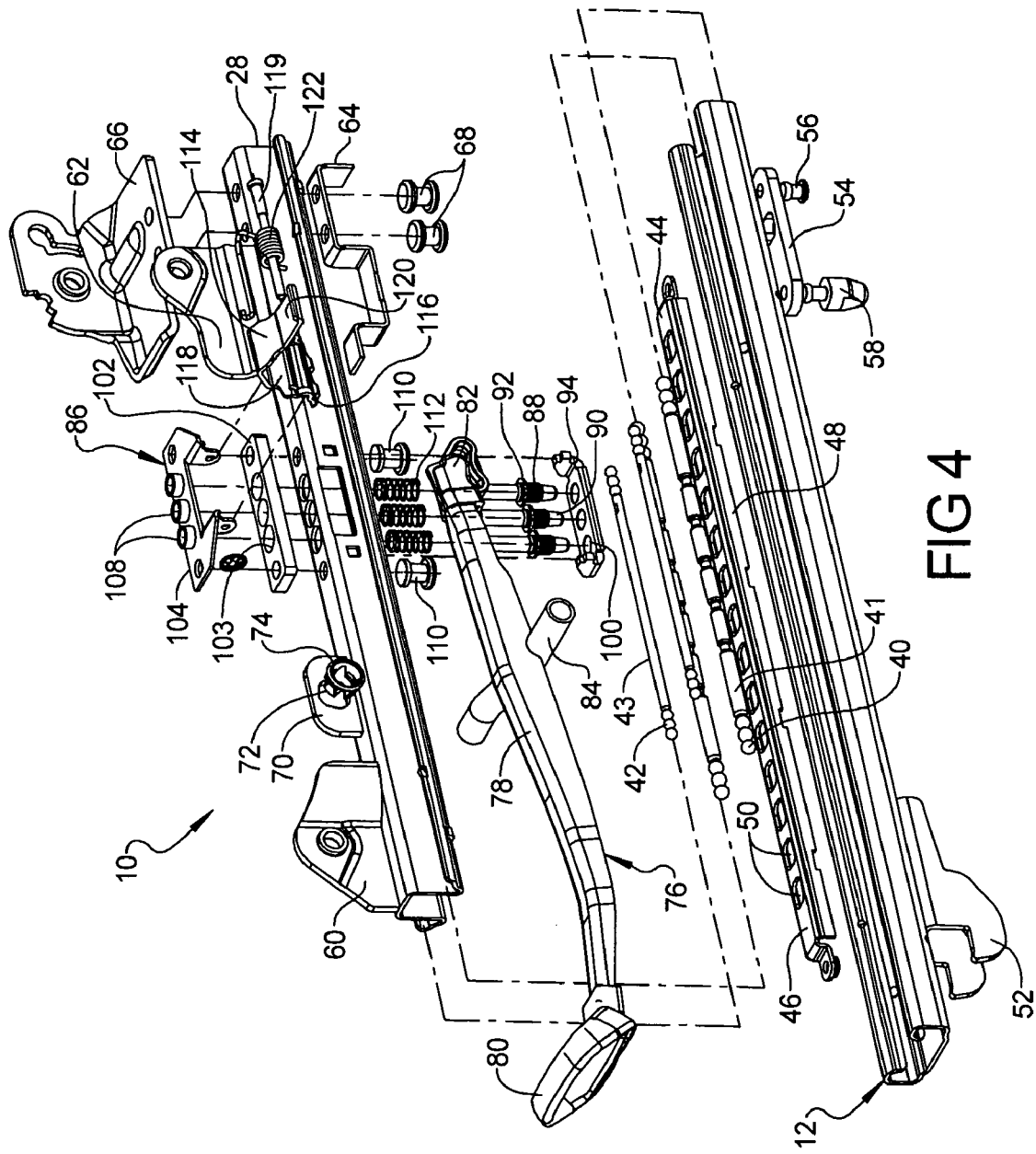
FIG. 4 is an exploded view of the seat track system of FIG. 2.
Figure 5:
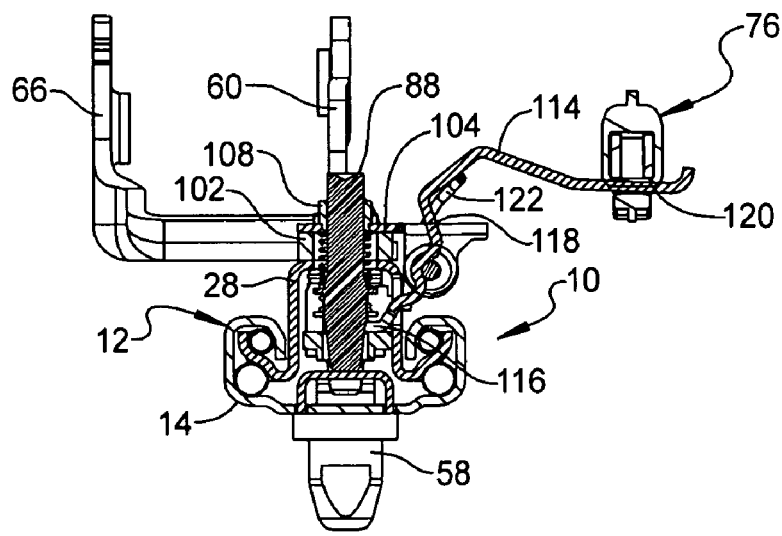
FIG. 5 is a sectional view of a portion of the seat track system of FIG. 3.
Figure 6:
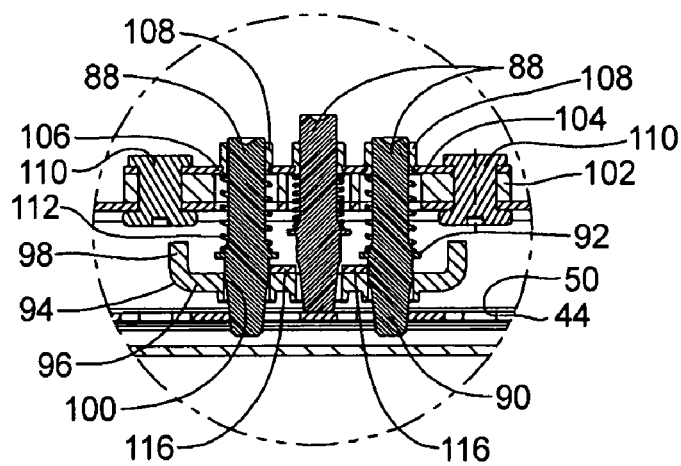
FIG. 6 is a fragmentary side view of a portion of the seat track system of FIG. 2.
Figure 7:
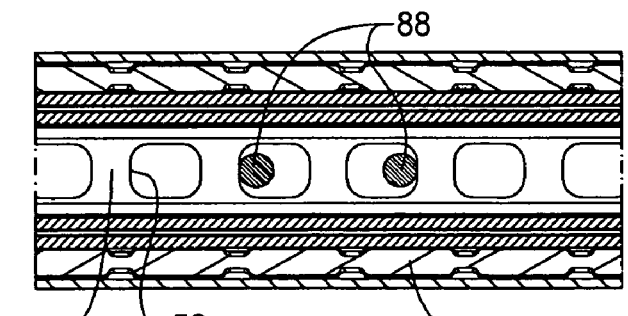
FIG. 7 is a fragmentary plan view of a portion of the seat track system of FIG. 2.
Figure 8:
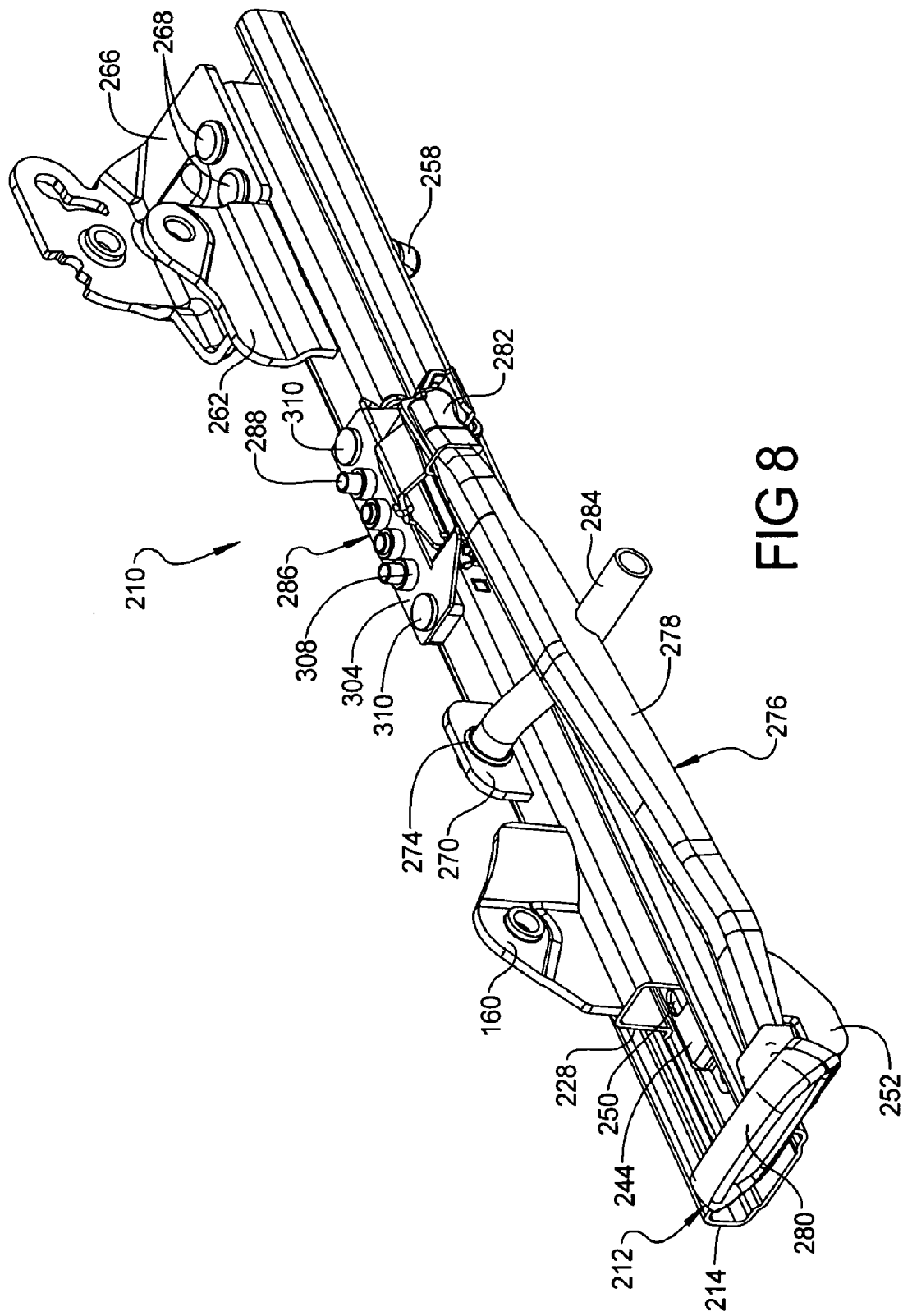
FIG. 8 is a perspective view of another embodiment, according to the present invention, of the seat track system of FIG. 2.
Figure 9:
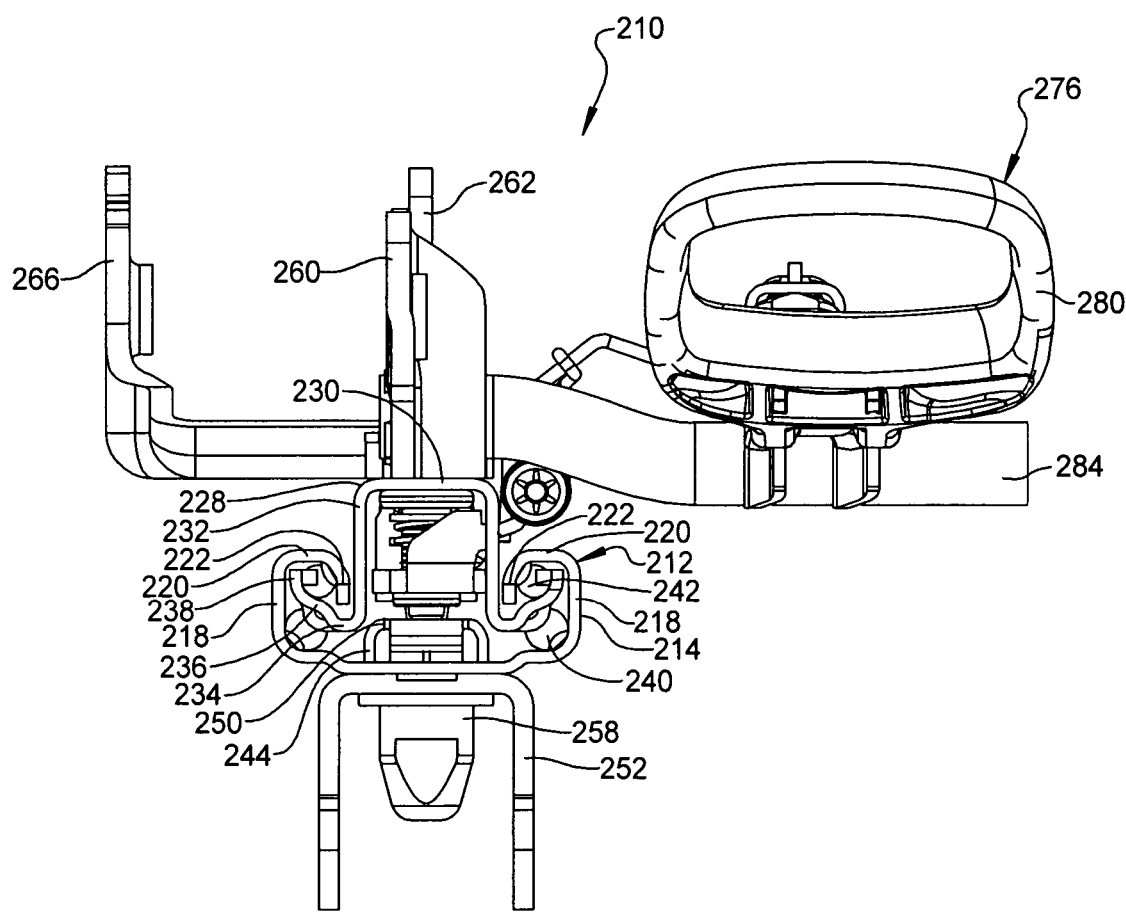
FIG. 9 is a front view of the seat track system of FIG. 8.
Figure 10:
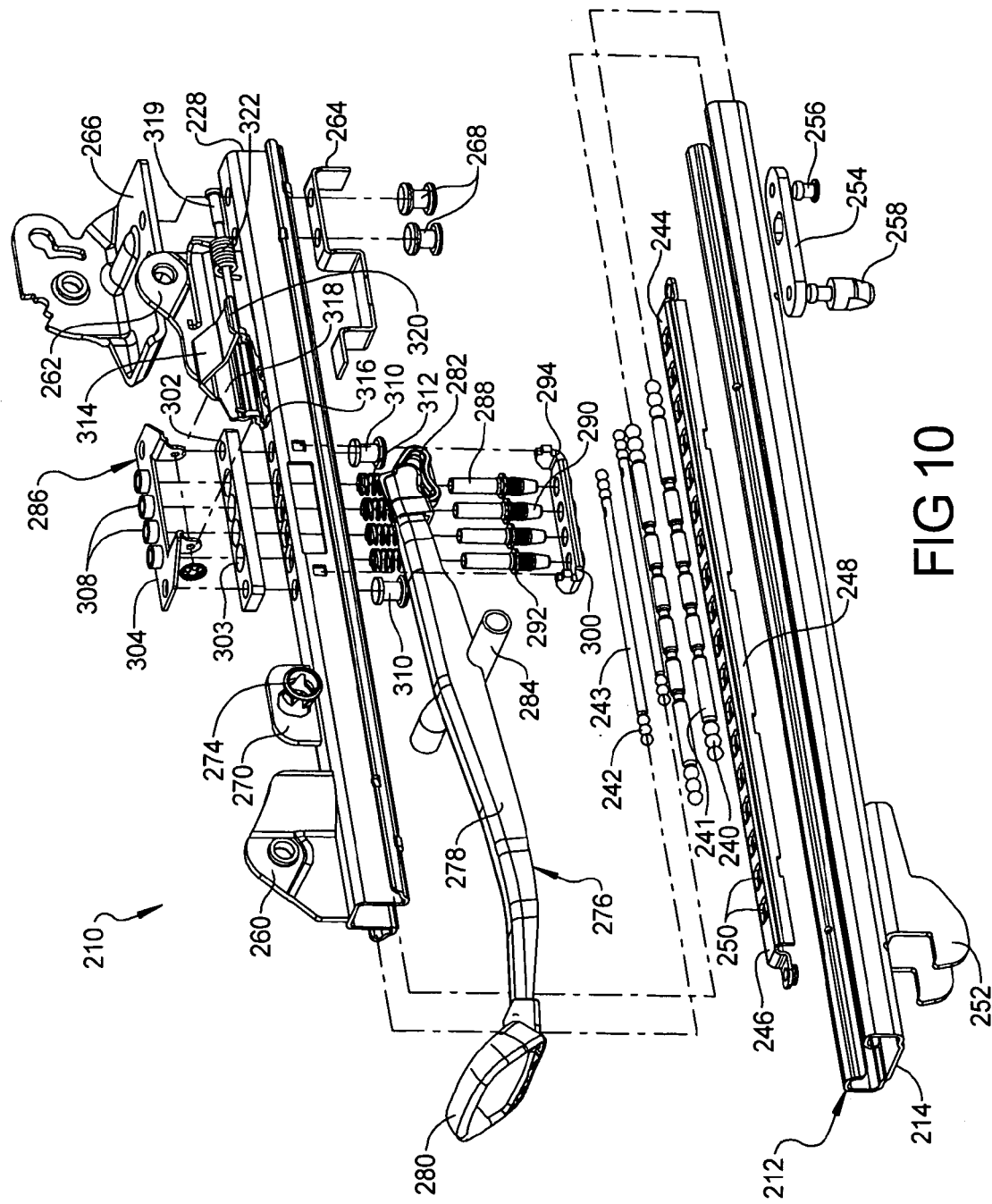
FIG. 10 is an exploded view of the seat track system of FIG. 8.
Figure 14:
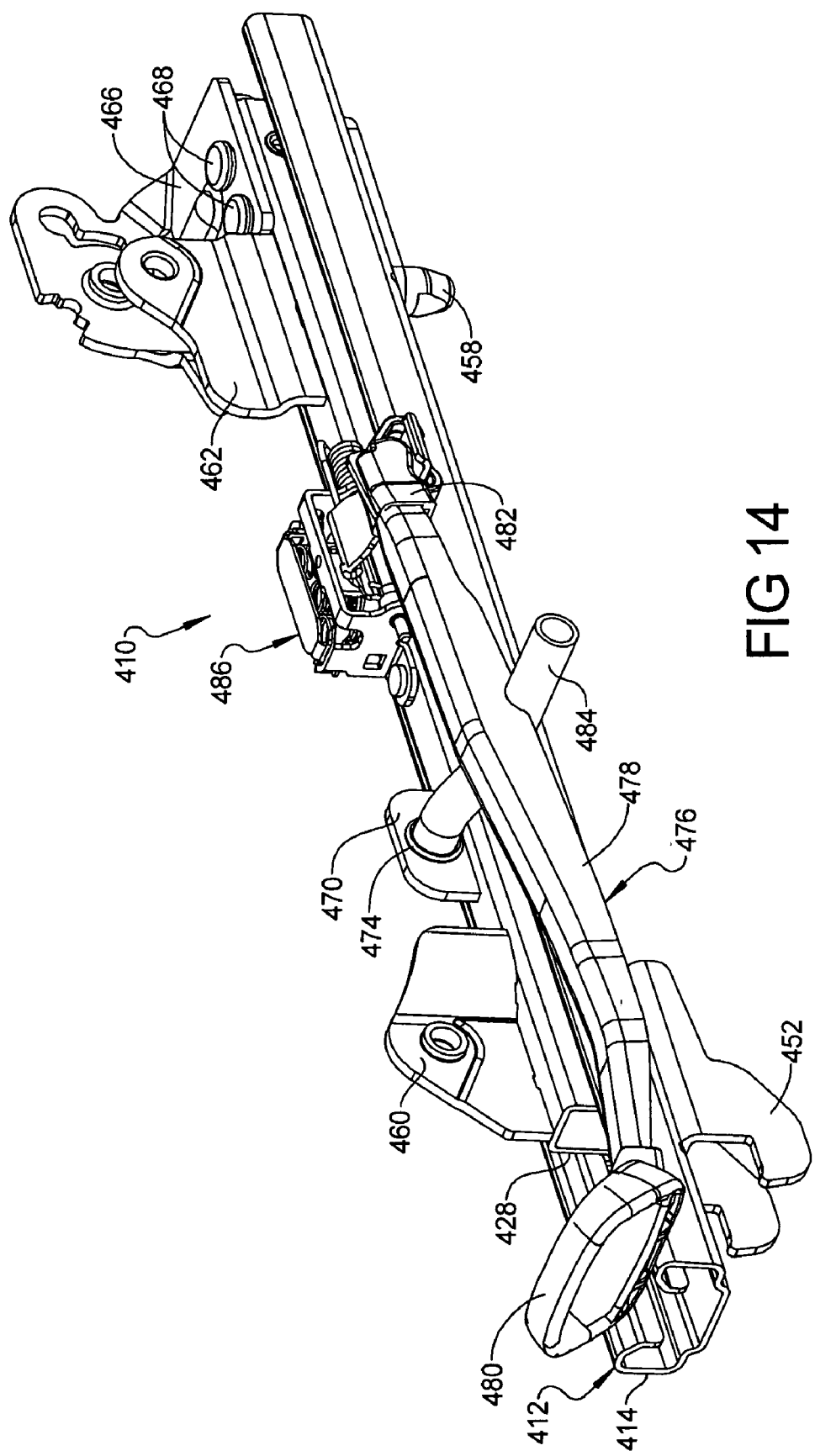
FIG. 14 is a perspective view of yet another embodiment, according to the present invention, of the seat track system of FIG. 2.
Figure 15:
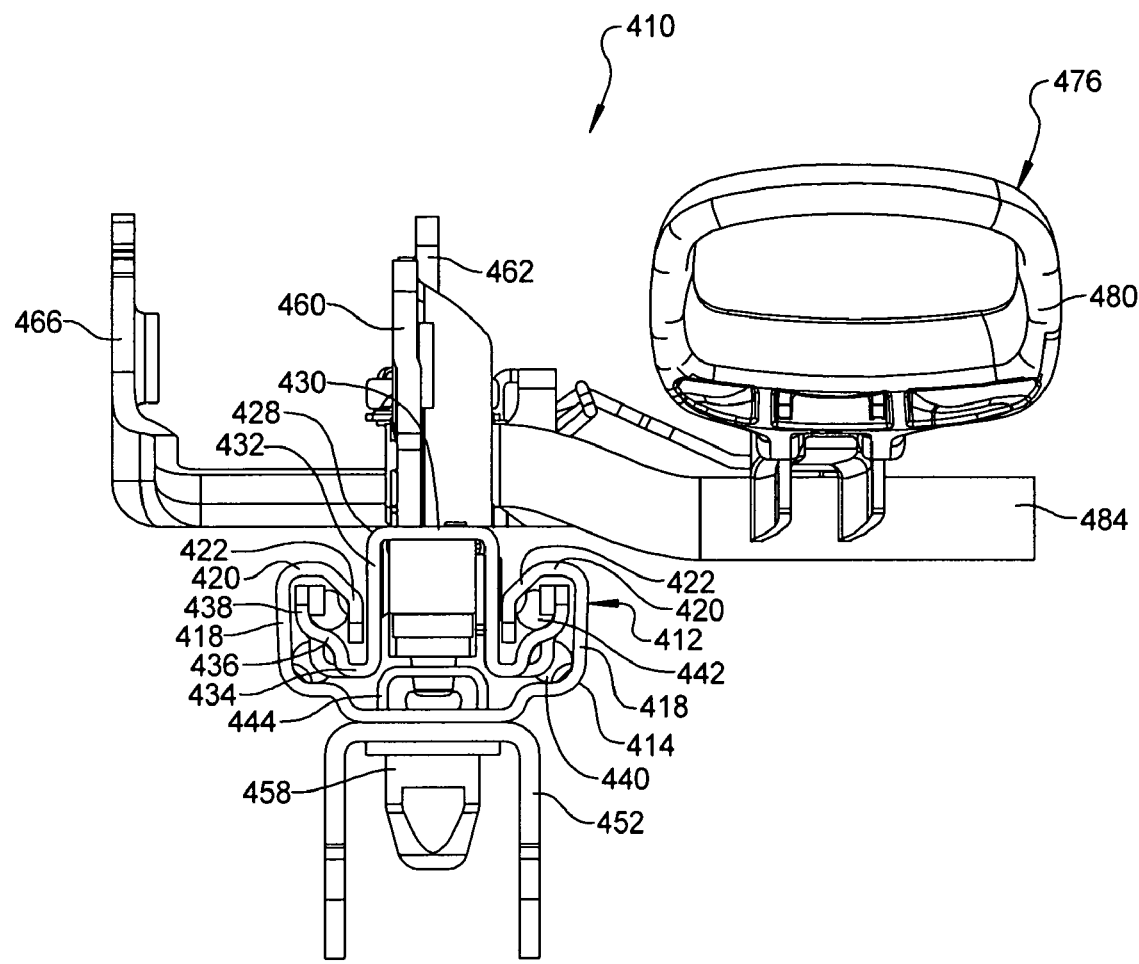
FIG. 15 is a front view of the seat track system of FIG. 14.
Figure 16:
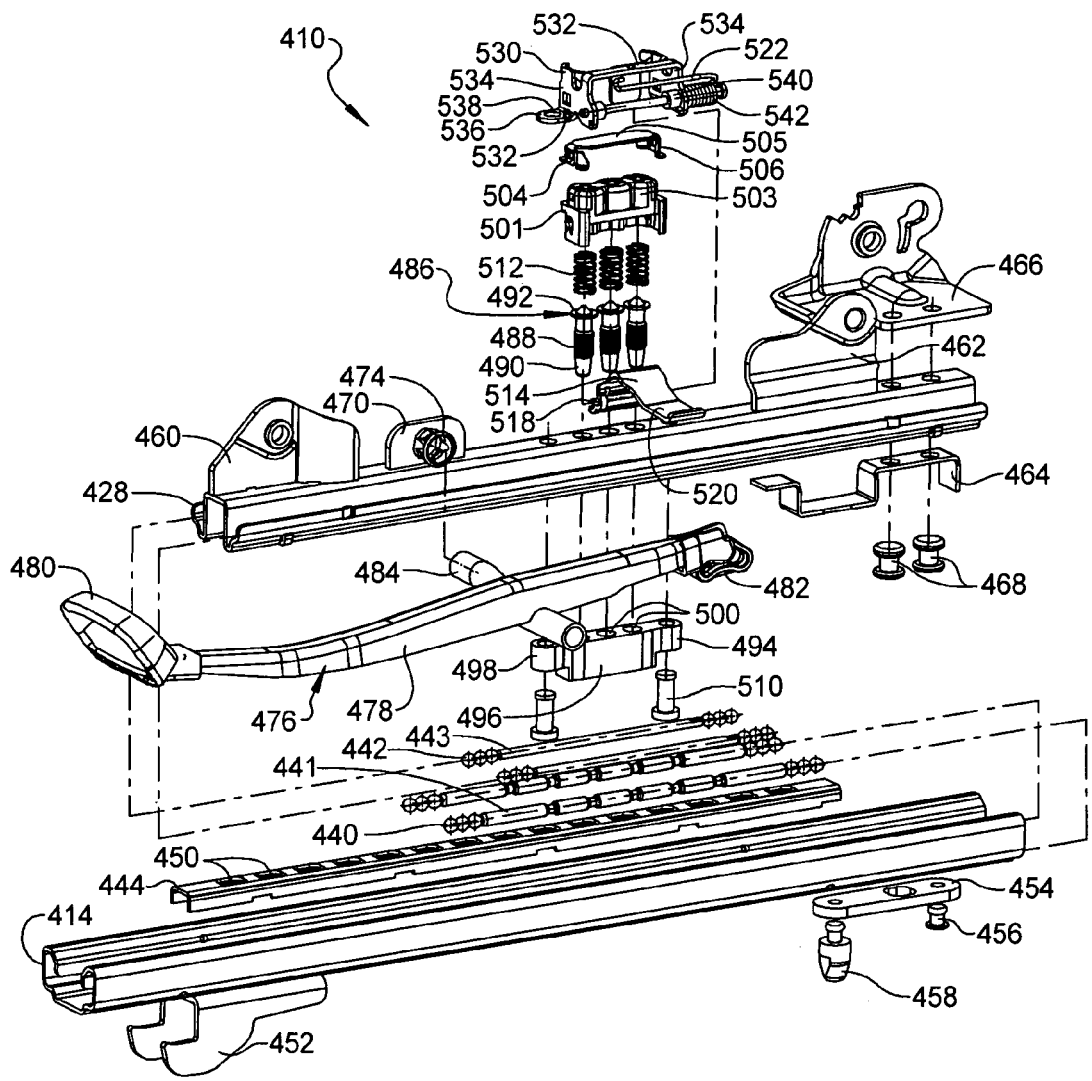
FIG. 16 is an exploded view of the seat track system of FIG. 14.
Figure 17:
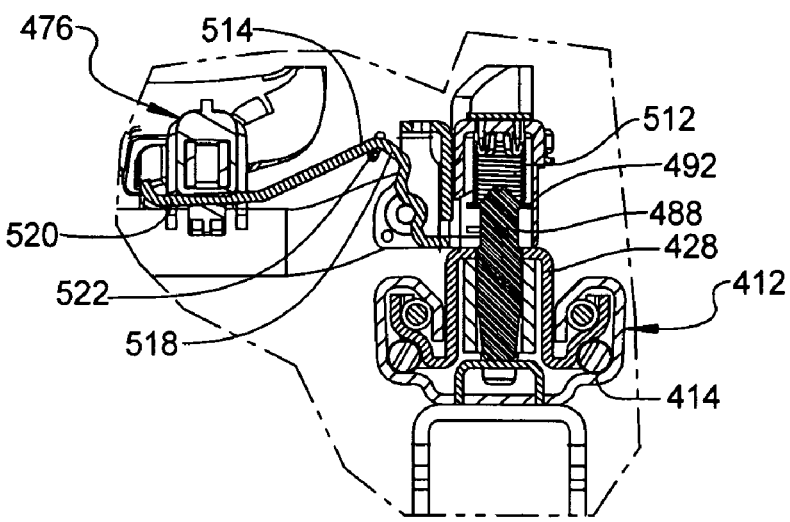
FIG. 17 is a sectional view of a portion of the seat track system of FIG. 14.
Figure 18:
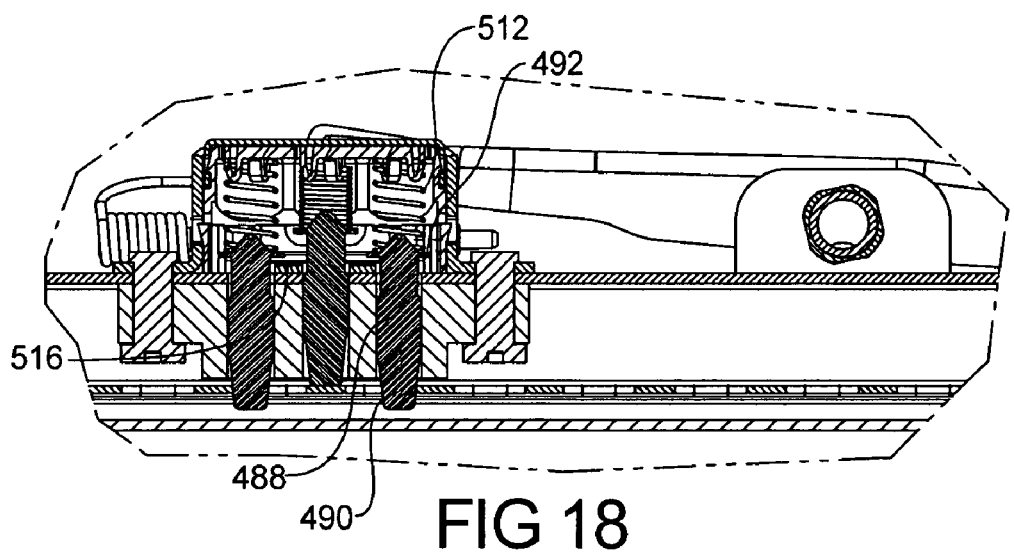
FIG. 18 is a fragmentary side view of a portion of the seat track system of FIG. 14.
Figure 19:
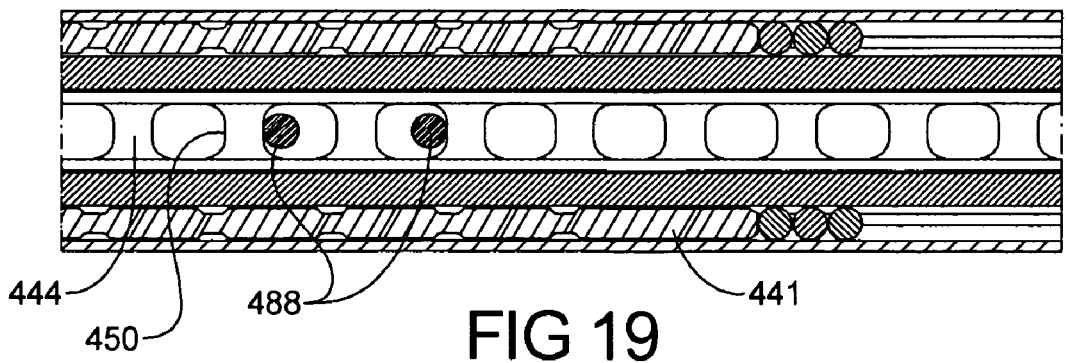
FIG. 19 is a fragmentary plan view of a portion of the seat track system of FIG. 14.
Figure 20:
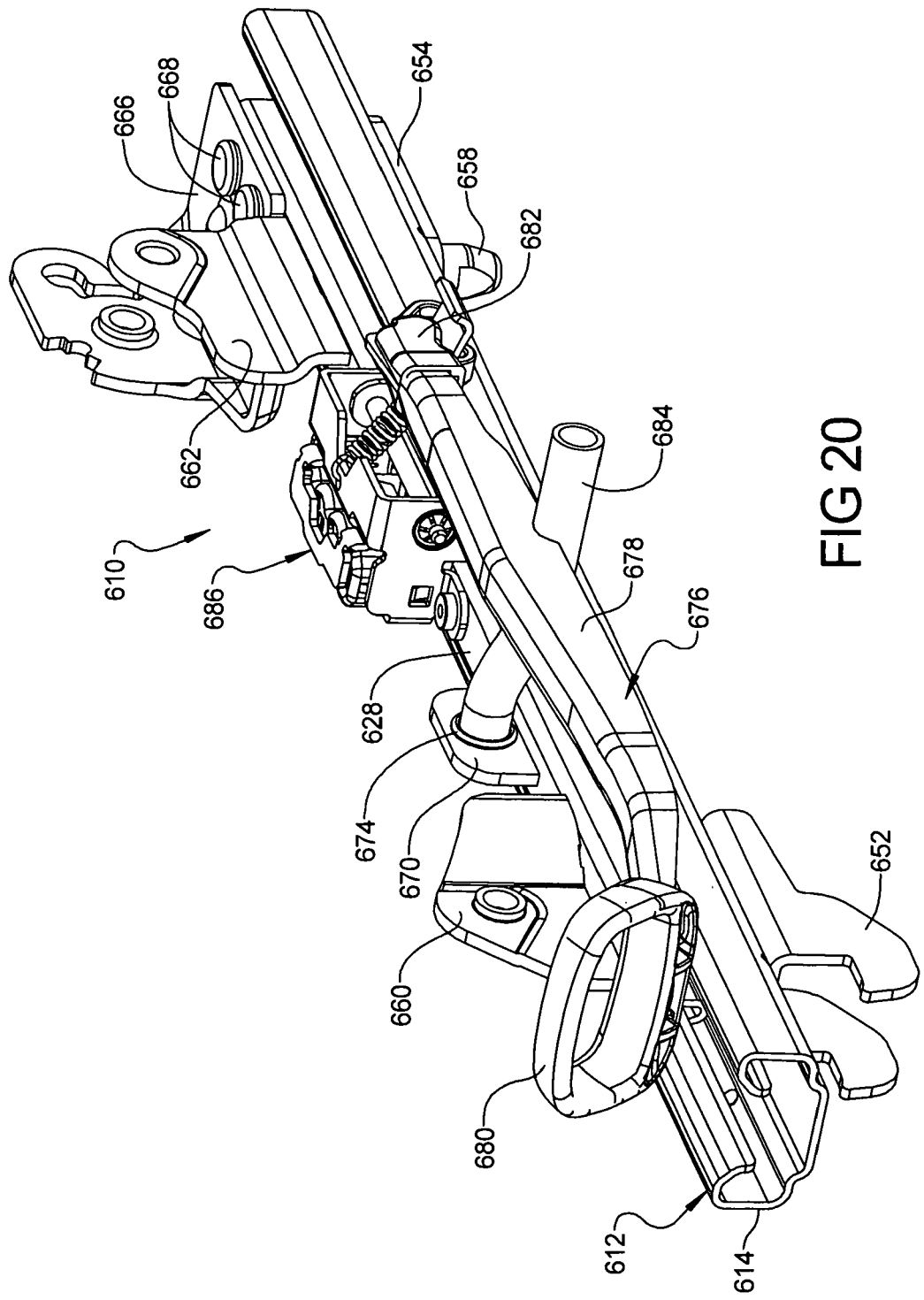
FIG. 20 is a perspective view of yet another embodiment, according to the present invention, of the seat track system of FIG. 2.
Figure 21:
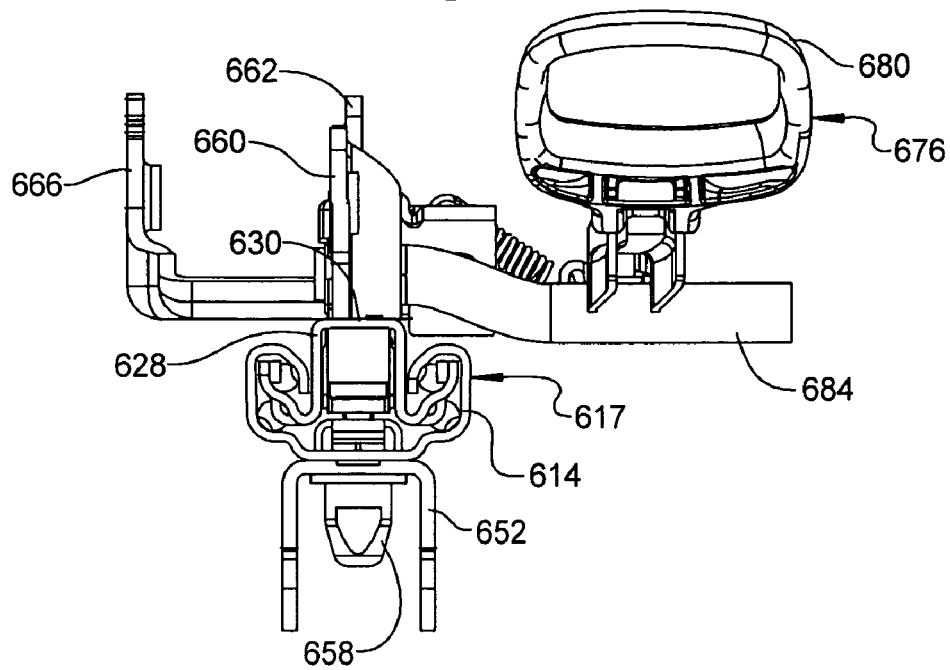
FIG. 21 is a front view of the seat track system of FIG. 20.
Figure 23:
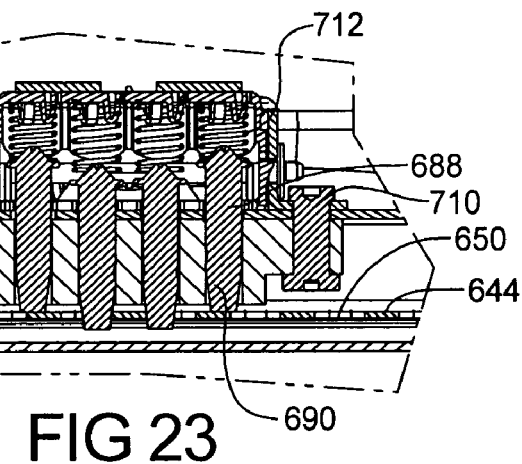
FIG. 23 is a sectional view of a portion of the seat track system of FIG. 20.
Figure 24:
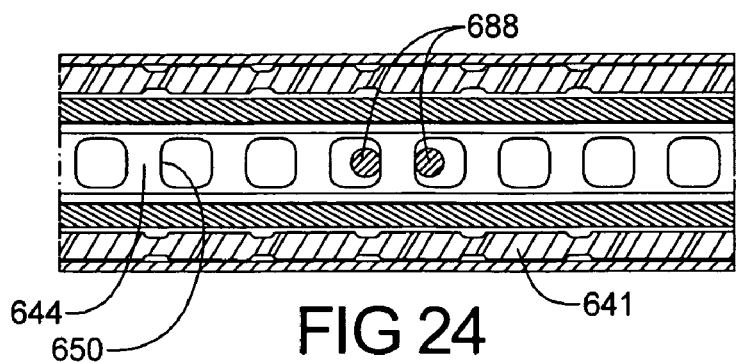
FIG. 24 is a fragmentary plan view of a portion of the seat track system of FIG. 20.
Figure 22:
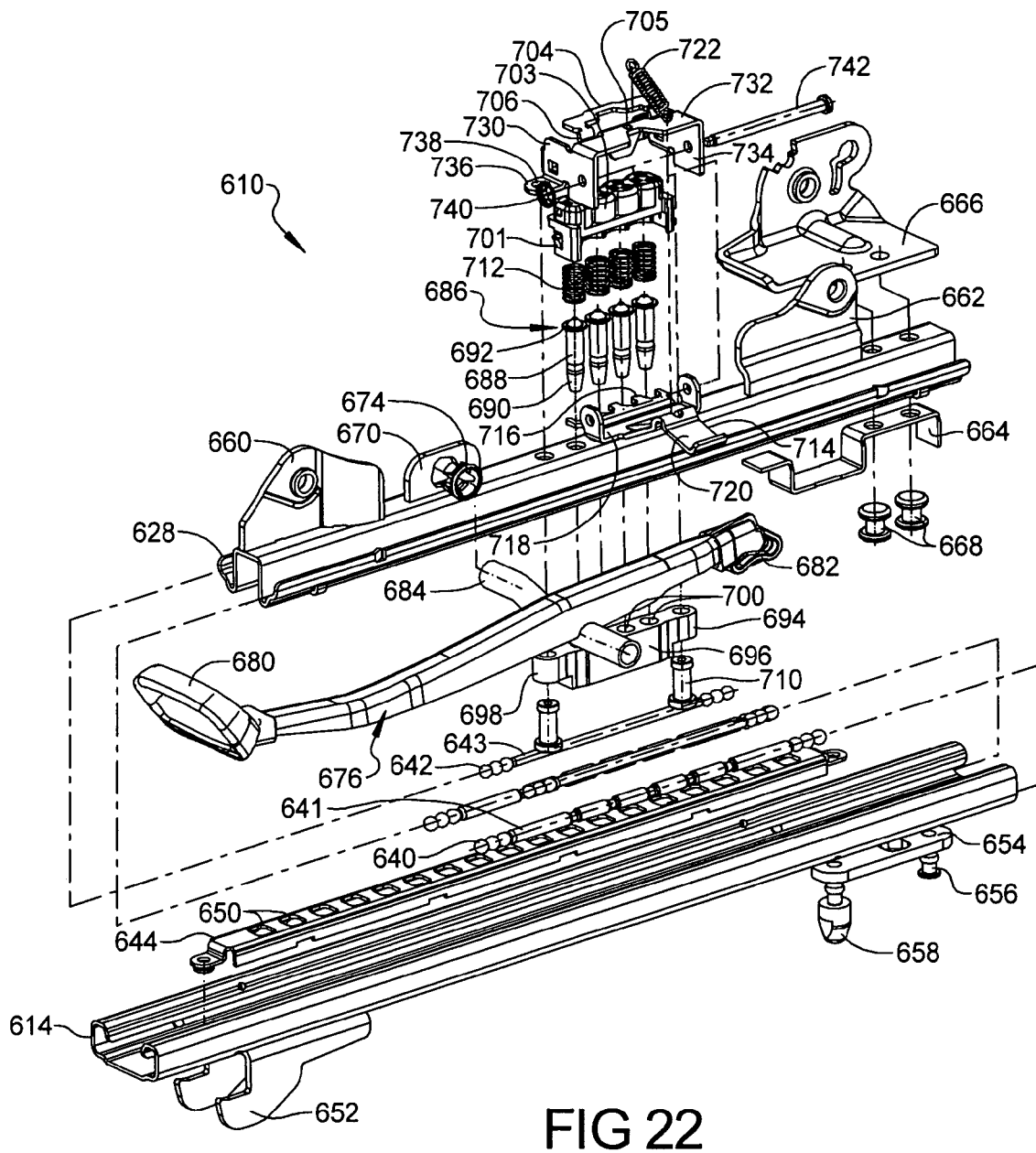
FIG. 22 is an exploded view of the seat track system of FIG. 20.
Figure 26A:
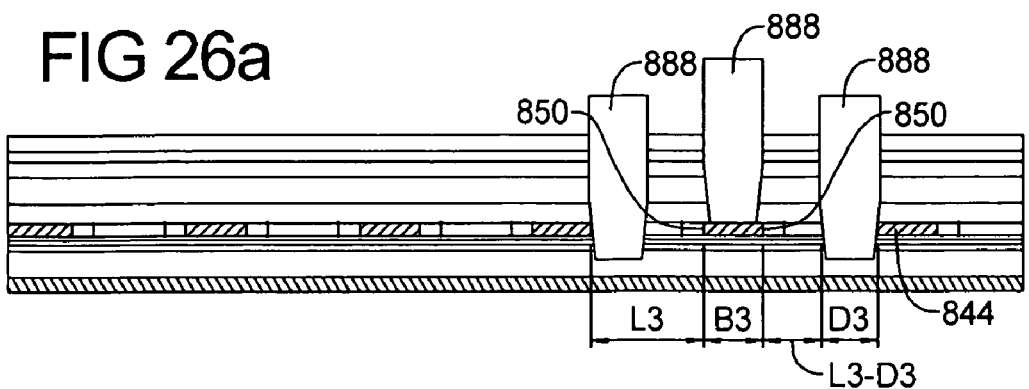
FIGS. 26a-d are fragmentary sectional views of a portion of the seat track system illustrated with three locking pins of FIG. 16.
Figure 26B:
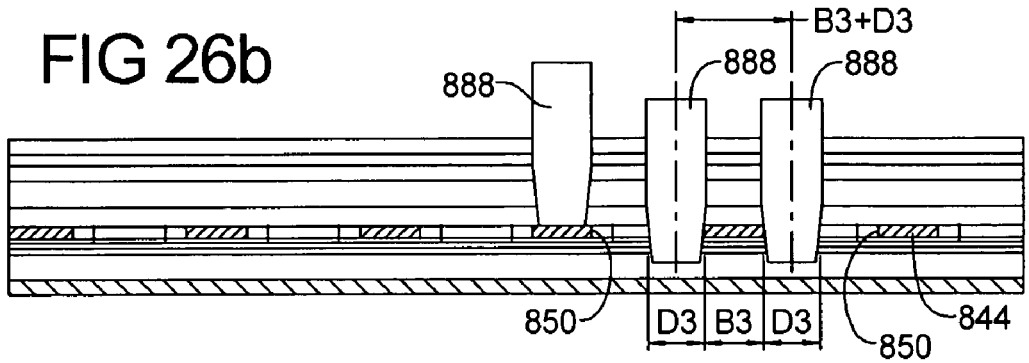
Figure 26C:
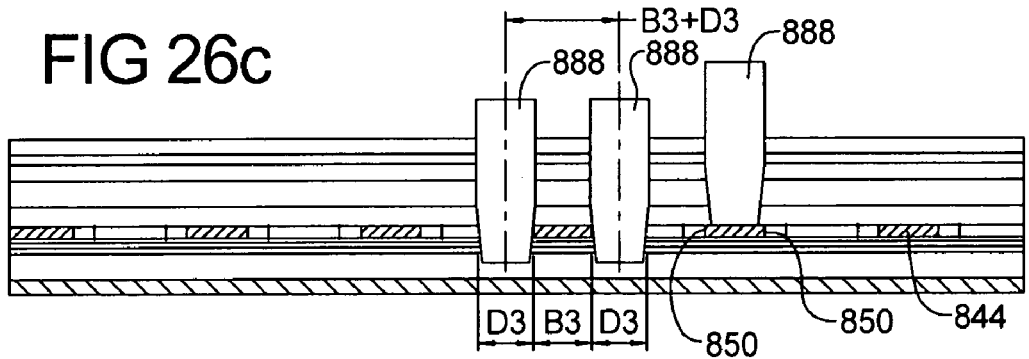
Figure 26D:
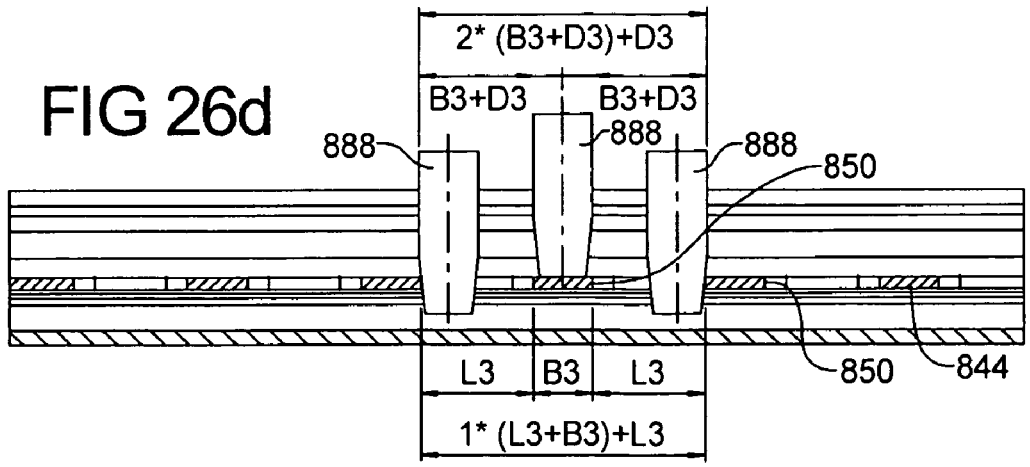
Figure 27A:
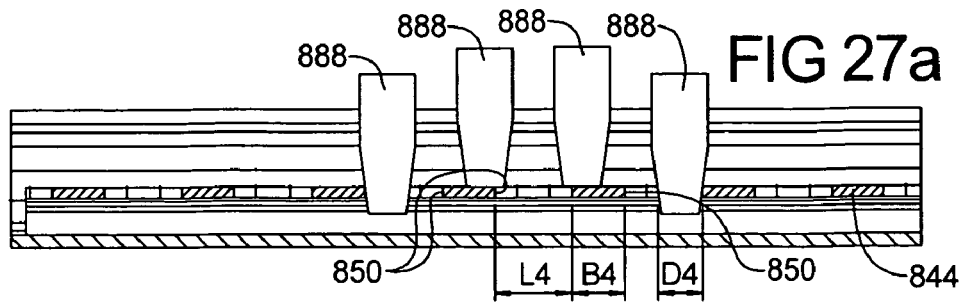
FIGS. 27a-e are fragmentary sectional views of a portion of the seat track system illustrated with four locking pins of FIG. 22.
Figure 27B:
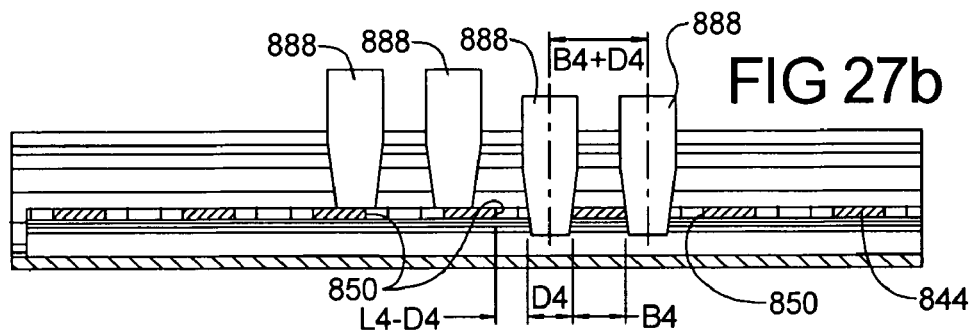
Figure 27C:
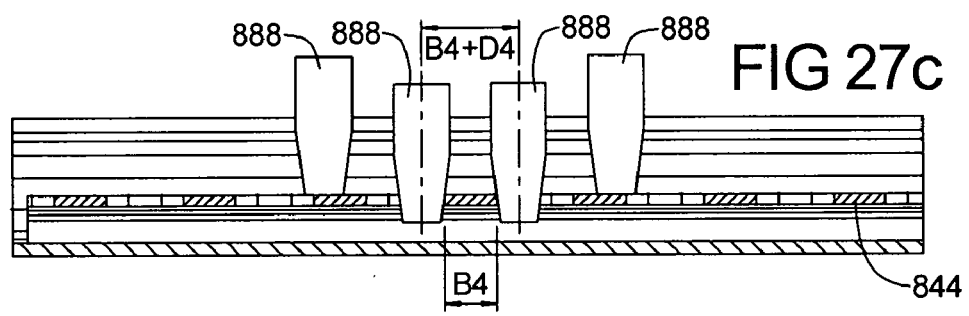
Figure 27D:
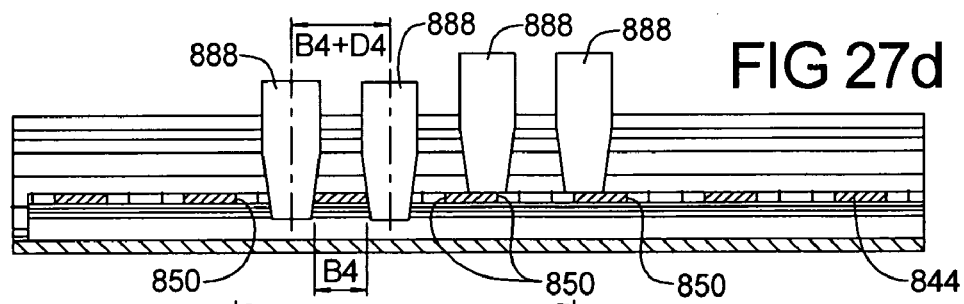
Figure 27E:
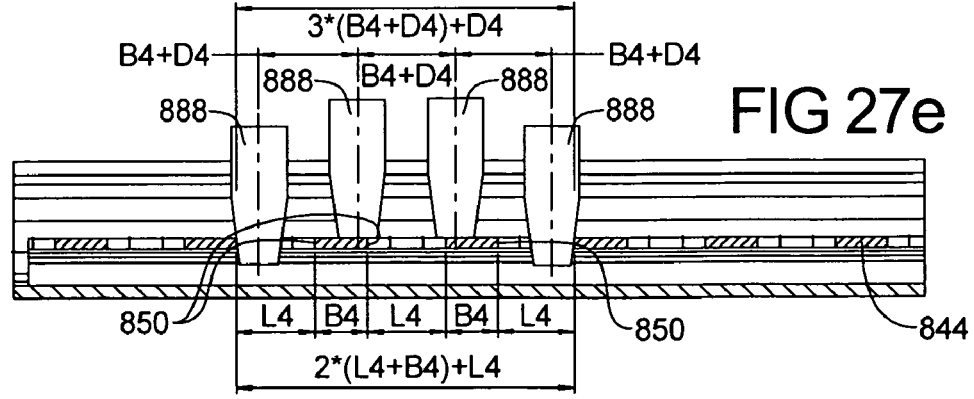

Referring now to the drawings, and in particular FIGS. 1 through 7, one embodiment of a seat track system 10, according to the present invention, is shown for adjusting a longitudinal position of a seat 11 (FIG. 1) in a vehicle (not shown) such as an automotive vehicle. The seat track system 10 includes at least one or more low profile seat rails or tracks, generally indicated at 12, interconnecting the seat 11 and a floor (not shown) of the vehicle. As illustrated, the seat track 12 extends longitudinally. The seat track 12 includes a lower track member 14. The lower track member 14 has a lower base portion 16 extending laterally and a pair of side portions 18 extending upwardly from the sides of the base portion 16 to form a generally "U" shape. The lower track member 14 has an upper flange 20 extending laterally inward from each side portion 18 and a side flange 22 extending downwardly from each upper flange 20 to form a generally inverted "U" shape. The lower track member 14 is connected to a seat riser (not shown) of the floor. It should be appreciated that there are two seat tracks 12 per seat 11 and that the lower track member 14 is attached to an outboard and inboard seat riser.

Each seat track 12 also includes an upper track member 28 to slide along the lower track member 14. The upper track member 28 has an upper base portion 30 extending laterally and a pair of side portions 32 extending downwardly from the sides of the base portion 30 to form a generally inverted "U" shape. The upper track member 28 also has a lower flange 34 at each lower end of the side portions 32 extending laterally outwardly. The upper track member 28 has a second flange 36 extending arcuately upwardly from the first flange 30 in a convex manner and a third flange 38 extending arcuately upwardly from the second flange 36 in a concave manner. The track members 14 and 28 are made of a rigid material such as metal. The upper track member 28 is connected to a seat pan (not shown) of the seat 11.

The track members 14 and 28 have a predetermined wall thickness of approximately 1.8-2 millimeters. The lower track member 14 has a vertical height from the outer surface of the base portion 16 to the outer surface of the upper flange 20 of approximately 19 millimeters. The upper track member 28 has a vertical height from the outer surface of the base portion 16 to the outer surface of the base portion 30 of approximately 30 millimeters. It should be appreciated that the seat tracks 12 have a low profile because locking elements to be described do not extend through the lower track member 14. It should also be appreciated that the lower track member 14 is fixed and the upper track member 28 may be moved by a suitable mechanism to be described.

The seat track system 10 also includes one or more first rollers 40 and spacers 41 disposed in the space between the second flange 36 and the corner between the base portion 16 and side portions 18 of the lower track member 14. The rollers are generally spherical in shape and the spacers 41 are generally cylindrical in shape. The rollers 40 and spacers 41 are spaced longitudinally between the track members 14 and 28. The rollers 40 contact the interior surface of the lower track member 14 and the outer surface of the upper track member 28. The seat track system 10 also includes one or more second rollers 42 and spacers 43 disposed in the space between the third flange 38 and the corner between the upper flange 20 and the side flange 22 of the lower track member 14. The rollers 42 are generally spherical in shape and the spacers 43 are generally cylindrical in shape, both being spaced longitudinally between the track members 14 and 28. The rollers 42 contact the interior surface of the lower track member 14 and the interior surface of the upper track member 28. It should be appreciated that the rollers 40 and 42 allow the upper track member 28 to slide on the lower track member 14 with minimal friction.

The seat track system 10 includes a locking member or bracket 44 extending longitudinally and disposed within the lower track member 14. The locking member 44 has an upper base portion 46 extending laterally and a pair of side portions 48 extending downwardly from the sides of the base portion 46 to form a generally inverted "U" shape. The base portion 46 has a plurality of apertures 50 extending therethrough and spaced longitudinally. The locking member 44 is made of a rigid material such as metal. The locking member 44 is connected to the lower track member 14 by a suitable mechanism such as welding.

The seat track system 10 may include a front hook attachment 52 secured to the bottom of the lower track member 14 by a suitable mechanism such as welding for engaging the seat riser (not shown). The seat track system 10 may also include a distance plate 54 attached to the lower track member 14 by a suitable mechanism such as a rivet 56 and a locating pin 58. It should be appreciated that the front hook attachment 52, distance plate 54, rivet 56, and locating pin 58 are conventional and known in the art.

The seat track system 10 may include a forward linkage bracket 60 attached to a forward end of the upper track member 28 and a rearward linkage bracket 62 attached to a rearward end of the upper track member 28 by a suitable mechanism such as welding. The seat track system 10 may include a reinforcement bracket 64 disposed within the rearward end of the upper track member 28 and a belt buckle bracket 66 mounted to the upper track member 28 opposite the reinforcement bracket and rearward of the rearward linkage bracket 62. The seat track system 10 includes a plurality of rivets 68 for securing the reinforcement bracket 64, belt buckle bracket 66, and upper track member 28 together as a single unit. It should be appreciated that the linkage brackets 60,62 and belt buckle bracket 66 are conventional and known in the art.

The seat track system 10 includes a cross tube attachment bracket 70 secured to the upper track member 28 by a suitable mechanism such as welding. The cross tube attachment bracket 70 has an aperture 72 extending therethrough. The seat track system 10 also includes a bearing bushing 74 extending through the aperture 72 in the cross tube attachment bracket 70.

The seat track system 10 includes a release mechanism, generally indicated at 76, for releasing and moving the upper track member 28 relative to the lower track member 14. The release mechanism 76 includes an actuation lever 78 extending longitudinally. The release mechanism 76 has a handle 80 at a forward end and an end cap 82 at the rearward end of the actuation lever 78. The handle 80 and end cap 82 are made of a plastic material. The release mechanism 76 also includes a cross tube 84 having one end attached to the actuation lever 78 and the other end attached to the bushing 74. As illustrated, the release mechanism 76 is a pivotal lever having a handle. It should be appreciated that the release mechanism 76, although illustrated as a lever, may be push rods for Bowden cable or a bar as is conventional and known in the art. It should also be appreciated that the release mechanism 76 is operated by an operator grasping the handle 80 and rotating the actuation lever 78 via the cross tube 84. It should further be appreciated that the release mechanism 76 is conventional and known in the art.

The seat track system 10 includes a positive engagement locking mechanism, generally indicated at 86, to lock the upper track member 28 to the locking member 44. The locking mechanism 86 includes a plurality of locking elements such as locking pins 88 extending vertically and through the apertures of the locking member 44. In the embodiment illustrated, three locking pins 88 are used to engage two apertures 50 in the locking member 44. Each locking pin 88 is generally cylindrical in shape and has a frustoconical lower end 90 to engage the apertures 50 in the locking member 44. Each locking pin 88 also has a flange 92 extending radially outwardly a distance spaced from the lower end 90 to act as a spring seat for a spring to be described. Each locking pin 88 is made of a metal material such as steel. Two of the locking pins 88 engage the base portion 46 through the apertures 50 of the locking member 44 for a function to be described. It should be appreciated that the positive engagement locking system 86 provides positive or continuous engagement in any position of the upper track member 28 to the lower track member 14, wherein for any position of the seat 11, the upper track member 28 is secured to the lower track member 14. It should also be appreciated that in every position of the upper track member 28, one locking pin 88 of the locking system 86 will always fall into one of the apertures 50 of the lower track member 14. It should further be appreciated that the upper track member 28 can only move relative to the lower track member 14 until the locking pin 88 hits the edge of the aperture 50, at that point, the second locking pin 88 engages the locking member 44 and eliminates the free-play.

The locking mechanism 86 also includes a guide bracket 94 to guide the locking pins 88 into engagement with the locking member 44. The guide bracket 94 extends longitudinally and has a base portion 96 and a pair of side portions 98 extending upwardly from the sides of the base portion 96 to form a generally "U" shape. The guide bracket 94 has a plurality of guide apertures 100 extending therethrough and spaced longitudinally for the locking pins 88. As illustrated, the guide bracket 94 has three guide apertures 100, one guide aperture 100 for each locking pin 88. The guide bracket 94 is made of a metal material such as steel.

The locking mechanism 86 includes a spacer 102 disposed on the base portion 30 of the upper track member 28. The spacer 102 has a plurality of guide apertures 103 extending therethrough and spaced longitudinally for the locking pins 88. The spacer 102 is generally rectangular in shape and has a predetermined thickness. The spacer 102 is made of a metal material.

The locking mechanism 86 also includes a cover plate 104 disposed on the spacer 102. The cover plate 104 is generally "C" shaped. The cover plate 104 includes a plurality of apertures 106 extending therethrough and corresponding to the number of locking pins 88. The locking mechanism 86 further includes one or more rivets 110 extending through the cover plate 104, spacer 102, and base portion 30 of the upper track member 28 to secure the cover plate 104, spacer 102, and upper track member 28 together as a unit.

The locking mechanism 86 includes a plurality of sleeves 108 disposed on the cover plate 104. One sleeve 108 is located over one of the apertures 106. The sleeves 108 are secured to the cover plate 104 by a suitable mechanism such as welding.

The locking mechanism 86 also includes a plurality of springs 112 for the locking pins 88. One spring 112 is disposed over one locking pin 88 and has one end that engages the flange 92 of the locking pin 88 and another end that engages the sleeve 108. The springs 112 are compression springs.

The locking mechanism 86 further includes an actuation member 114 to move the locking pins 88. The actuation member 114 includes a plurality of fingers 116 extending outwardly. The fingers 116 are disposed between the locking pins 88 and engage the flanges 92 of the locking pins 88 to move them upwardly against the springs 112. The actuation member 114 has a main portion 118 extending upwardly from the fingers 116. The main portion 118 is pivotally attached to the cover plate 104 by a suitable mechanism such as a rod 119. The actuation member 114 has a flange portion 120 extending outwardly from the main portion 118 to engage the release mechanism 76.

The locking mechanism 86 also includes a wire spring 122 for urging the fingers 116 in a non-engaged position with the flanges 92 of the locking pins 88. The wire spring 122 has a configuration such that one end engages the guide bracket 94 and the other end engages the flange portion 120 of the actuation member 114 to urge the flange portion 120 upwardly such that the fingers 116 do not engage the flanges 92 of the locking pins 88.

Referring to FIGS. 1 through 7, the seat track system 10 is in an engaged position. As illustrated, two of the locking pins 88 engage two of the apertures 50 in the locking member 44. In this position, the locking mechanism 86 provides positive or continuous engagement of the upper track member 28 to the lower track member 14 and the upper track member 28 is secured to the lower track member 14.

To move the seat longitudinally, the release mechanism 76 is operated by an operator grasping the handle 80 and rotating the actuation lever 78 via the cross tube 84. When this occurs, the actuation member 114 is rotated such that the fingers 116 between the locking pins 88 engage the flanges 92 of the locking pins 88 to move them upwardly against the springs 112 to exit the apertures 50 in the locking member 44. The upper track member 28 may then be moved longitudinally relative to the lower track member 14.

Once the seat is moved to a new position, the release mechanism 76 is released by the operator. On the return motion of the actuation lever 78 being released, this return motion causes the actuation member 114 to rotate due to the wire spring 122 such that the fingers 116 between the locking pins 88 disengage the flanges 92 of the locking pins 88 and the springs 112 move the locking pins 88 downwardly. When this occurs, one locking pin 88 will fall into one of the apertures 50 of the lower track member 14 and the second locking pin 88 engages the locking member 44 to secure the upper track member 28 to the lower track member 14.

Referring to FIGS. 8 through 13, another embodiment 210, according to the present invention, of the seat track system 10 is shown. Like parts of the seat track system 10 have, like reference numerals increased by two hundred (200). In this embodiment, the seat track system 210 includes the lower track member 214, upper track member 228, and locking member 244. The seat track system 210 may also include front hook attachment 252, distance plate 254, rivet 256, and locating pin 258. The seat track system 210 includes the forward linkage bracket 260, rearward linkage bracket 262, reinforcement bracket 264, belt buckle bracket 266, and rivets 268. The seat track system 210 includes the cross tube attachment bracket 270, bearing bushing 274, and release mechanism 276. The release mechanism 276 includes the actuation lever 278, handle 280, end cap 282, and cross tube 284.

The seat track system 210 also includes a positive engagement locking mechanism, generally indicated at 286, to lock the upper track member 228 to the locking member 244. The locking mechanism 286 includes a plurality of locking elements such as locking pins 288 extending vertically and through the apertures 250 of the locking member 244. In the embodiment illustrated, four locking pins 288 are used to engage two apertures 250 in the locking member 244. Each locking pin 288 is generally cylindrical in shape and has a frustoconical lower end 290 to engage the apertures 250 in the locking member 244. Each locking pin 288 also has a flange 292 extending radially outwardly a distance spaced from the lower end 290 to act as a spring seat for a spring to be described. Each locking pin 288 is made of a metal material such as steel. Two of the locking pins 288 engage the base portion 246 through the apertures 250 of the locking member 244 for a function to be described. It should be appreciated that a positive locking system provides positive or continuous engagement in any position of the upper track member 228 to the lower track member 214, wherein for any position of the seat, the upper track member 228 is secured to the lower track member 214. It should also be appreciated that in every position of the upper track member 228, one locking pin 288 of the locking system 286 will always fall into one of the apertures 250 of the lower track member 214. It should further be appreciated that the upper track member 228 can only move relative to the lower track member 214 until the locking pin 288 hits the edge of the aperture 250, at that point, the second locking pin 288 engages the locking member 244 and eliminates the free-play.

The locking mechanism 286 also includes a locking pin guide arm 294 to guide the locking pins 288 into engagement with the locking member 244. The locking pin guide arm 294 extends longitudinally and is generally rectangular in shape. The locking pin guide arm 294 extends longitudinally and has a base portion 296 and a pair of side portions 298 extending longitudinally from the sides of the base portion 296. The locking pin guide arm 294 has a plurality of guide apertures 300 extending therethrough and spaced longitudinally for the locking pins 288. As illustrated, the locking pin guide arm 294 has four guide apertures 300, one guide aperture 300 for each locking pin 288. The guide bracket 294 is made of a metal material such as steel. The locking pin guide arm 294 is disposed within the upper track member 228 and secured to the upper track member 228 by a suitable mechanism such as rivets 310 extending through apertures in the side portions 298.

The locking mechanism 286 includes a spacer 302 disposed on the base portion 230 of the upper track member 228. The spacer 302 has a plurality of guide apertures 303 extending therethrough and spaced longitudinally for the locking pins 288. The spacer 302 is generally rectangular in shape and has a predetermined thickness. The spacer 302 is made of a metal material.

The locking mechanism 286 also includes a cover plate 304 disposed on the spacer 302. The cover plate 304 is generally "C" shaped. The cover plate 304 includes a plurality of apertures 306 extending therethrough and corresponding to the number of locking pins 288. The locking mechanism 286 further includes one or more rivets 310 extending through the cover plate 304, spacer 302, and base portion 230 of the upper track member 228 to secure the cover plate 304, spacer 302, and upper track member 228 together as a unit.

The locking mechanism 286 includes a plurality of sleeves 308 disposed on the cover plate 304. One sleeve 308 is located over one of the apertures 306. The sleeves 308 are secured to the cover plate 304 by a suitable mechanism such as welding.

The locking mechanism 286 also includes a plurality of springs 312 for the locking pins 288. One spring 312 is disposed over one locking pin 288 and has one end that engages the flange 292 of the locking pin 288 and another end that engages the sleeve 308. The springs 312 are compression springs.

The locking mechanism 286 further includes an actuation member 314 to move the locking pins 288. The actuation member 314 includes a plurality of fingers 316 extending outwardly. The fingers 316 are disposed between the locking pins 288 and engage the flanges 292 of the locking pins 288 to move them upwardly against the springs 312. The actuation member 314 has a main portion 318 extending upwardly from the fingers 316. The main portion 318 is pivotally attached to the cover plate 304 by a suitable mechanism such as a rod 319. The actuation member 314 has a flange portion 320 extending outwardly from the main portion 318 to engage the release mechanism 276.

The locking mechanism 286 also includes a wire spring 322 for urging the fingers 316 in a non-engaged position with the flanges 292 of the locking pins 288. The wire spring 322 has a configuration such that one end engages the guide bracket 294 and the other end engages the flange portion 320 of the actuation member 314 to urge the flange portion 320 upwardly such that the fingers 316 do not engage the flanges 292 of the locking pins 288.

Referring to FIGS. 8 through 13, the seat track system 210 is in an engaged position. As illustrated, two of the locking pins 288 engage two of the apertures 250 in the locking member 244. In this position, the locking mechanism 286 provides positive or continuous engagement of the upper track member 228 to the lower track member 214 and the upper track member 228 is secured to the lower track member 214.

To move the seat longitudinally, the release mechanism 276 is operated by an operator grasping the handle 280 and rotating the actuation lever 278 via the cross tube 284. When this occurs, the actuation member 314 is rotated such that the fingers 316 between the locking pins 288 engage the flanges 292 of the locking pins 288 to move them upwardly against the springs 312 to exit the apertures 250 in the locking member 244. The upper track member 228 may then be moved longitudinally relative to the lower track member 214.

Once the seat is moved to a new position, the release mechanism 276 is released by the operator. On the return motion of the actuation lever 278 being released, this return motion causes the actuation member 314 to rotate due to the wire spring 322 such that the fingers 316 between the locking pins 288 disengage the flanges 292 of the locking pins 288 and the springs 312 move the locking pins 288 downwardly. When this occurs, one locking pin 288 will fall into one of the apertures 250 of the lower track member 214 and the second locking pin 288 engages the locking member 244 to secure the upper track member 228 to the lower track member 214.

Referring to FIGS. 14 through 19, yet another embodiment 410, according to the present invention, of the seat track system 10 is shown. Like parts of the seat track system 10 have like reference numerals increased by four hundred (400). In this embodiment, the seat track system 410 includes the lower track member 414, upper track member 428, and locking member 444. The seat track system 410 may also include front hook attachment 452, distance plate 454, rivet 456, and locating pin 458. The seat track system 410 includes the forward linkage bracket 460, rearward linkage bracket 462, reinforcement bracket 464, belt buckle bracket 466, and rivets 468. The seat track system 410 further includes the cross tube attachment bracket 470, bearing bushing 474, and release mechanism 476. The release mechanism 476 includes the actuation lever 478, handle 480, end cap 482, and cross tube 484.

The seat track system 410 also includes a positive engagement locking mechanism, generally indicated at 486, to lock the upper track member 428 to the locking member 444. The locking mechanism 486 includes a plurality of locking elements such as locking pins 488 extending vertically and through the apertures 450 of the locking member 444. In the embodiment illustrated, three locking pins 488 are used to engage, two apertures 450 in the locking member 444. Each locking pin 488 is generally cylindrical in shape and has a frustoconical lower end 490 to engage the apertures 450 in the locking member 444. Each locking pin 488 also has a flange 492 extending radially outwardly a distance spaced from the lower end 490 to act as a spring seat for a spring to be described. Each locking pin 488 is made of a metal material such as steel. Two of the locking pins 488 engage the base portion 446 through the apertures 450 of the locking member 444 for a function to be described. It should be appreciated that a positive locking system provides positive or continuous engagement in any position of the upper track member 428 to the lower track member 414, wherein for any position of the seat, the upper track member 428 is secured to the lower track member 414. It should also be appreciated that in every position of the upper track member 428, one locking pin 488 of the locking system 486 will always fall into one of the apertures 450 of the lower track member 414. It should further be appreciated that the upper track member 428 can only move relative to the lower track member 414 until the locking pin 488 hits the edge of the aperture 450, at that point, the second locking pin 488 engages the locking member 444 and eliminates the free-play.

The locking mechanism 486 also includes a locking pin guide arm 494 to guide the locking pins 488 into engagement with the locking member 444. The locking pin guide arm 494 extends longitudinally and is generally rectangular in shape. The locking pin guide arm 494 extends longitudinally and has a base portion 496 and a pair of side portions 498 extending longitudinally from the sides of the base portion 496. The locking pin guide arm 494 has a plurality of guide apertures 500 extending therethrough and spaced longitudinally for the locking pins 488. As illustrated, the locking pin guide arm 494 has three guide apertures 500, one guide aperture 500 for each locking pin 488. The guide bracket 494 is made of a metal material such as steel. The locking pin guide arm 494 is disposed within the upper track member 428 and secured to the upper track member 428 by a suitable mechanism such as rivets extending through apertures in the side portions 498.

The locking mechanism 486 includes a spring housing 501 disposed on the base portion 430 of the upper track member 428. The spring housing 501 extends longitudinally and is generally rectangular in shape. The spring housing 501 has a plurality of spring cavities 503. As illustrated, the spring housing 501 has three spring cavities 503, one spring cavity 503 for each locking pin 488. The spring housing 501 is made of a metal material such as steel.

The locking mechanism 486 includes a cover plate 504 disposed over the spring housing 501. The cover plate 504 extends longitudinally and is generally rectangular in shape. The cover plate 504 has a main portion 505 and a pair of side portions 506 extending downwardly from the sides of the main portion 505. The cover plate 504 is generally "U" shaped. The cover plate 504 is attached to the spring housing 501 by a suitable mechanism.

The locking mechanism 486 also includes a plurality of pressure springs 512 for the locking pins 488. One pressure spring 512 is disposed over one locking pin 488 and has one end that engages the flange 492 of the locking pin 488 and another end that engages the spring housing 501. The pressure springs 512 are compression springs.

The locking mechanism 486 includes a bearing pin housing 530 disposed over the cover plate 504 and mounted to the upper track member 428. The bearing pin housing 530 extends longitudinally and is generally rectangular in shape. The bearing pin housing 530 has an upper base portion 532 and a pair of side portions 534 extending downwardly from the sides of the base portion 532. The bearing pin housing 530 has a flange portion 536 extending longitudinally from each side portion 534. The flange portion 536 has an aperture 538 extending therethrough. It should be appreciated that the rivets 510 previously described extend through the apertures 538 in the flange portions 536 to secure the bearing pin housing 530 to the upper track member 428.

The locking mechanism 486 also includes a distance bushing 540 secured to each of the side portions 534. The locking mechanism 486 includes a bearing bolt 542 extending through the distance bushings 540. The locking mechanism 486 includes a leg or wire spring 522 having a configuration such that one end engages the bearing pin housing 530 and the other end engages the bearing bolt 542. It should be appreciated that the bearing bolt 542 is rotatable in the distance bushings 540.

The locking mechanism 486 further includes an actuation member 514 such as an unlocking damper to move the locking pins 488. The actuation member 514 includes a plurality of fingers 516 extending outwardly. The fingers 516 are disposed between the locking pins 488 and engage the flanges 492 of the locking pins 488 to move them upwardly against the springs 512. The actuation member 514 has a main portion 518 extending upwardly from the fingers 516. The main portion 518 is pivotally attached to the bearing bolt 542. The actuation member 514 has a flange portion 520 extending outwardly from the main portion 518 to engage the release mechanism 476.

In operation of the seat track system 410, the seat track system 410 is in an engaged position. As illustrated, two of the locking pins 488 engage two of the apertures 450 in the locking member 444. In this position, the locking mechanism 486 provides positive or continuous engagement of the upper track member 428 to the lower track member 414 and the upper track member 428 is secured to the lower track member 414.

To move the seat longitudinally, the release mechanism 476 is operated by an operator grasping the handle 480 and rotating the actuation lever 478 via the cross tube 484. When this occurs, the actuation member 514 is rotated such that the fingers 516 between the locking pins 488 engage the flanges 492 of the locking pins 488 to move them upwardly against the springs 512 to exit the apertures 450 in the locking member 444. The upper track member 428 may then be moved longitudinally relative to the lower track member 414.

Once the seat is moved to a new position, the release mechanism 476 is released by the operator. On the return motion of the actuation lever 478 being released, this return motion causes the actuation member 514 to rotate due to the wire spring 522 such that the fingers 516 between the locking pins 488 disengage the flanges 492 of the locking pins 488 and the springs 512 move the locking pins 488 downwardly. When this occurs, one locking pin 488 will fall into one of the apertures 450 of the lower track member 414 and the second locking pin 488 engages the locking member 444 to secure the upper track member 428 to the lower track member 414.

Referring to FIGS. 20 through 24, still another embodiment 610, according to the present invention, of the seat track system 10 is shown. Like parts of the seat track system 10 have, like reference numerals increased by six hundred (600). In this embodiment, the seat track system 610 includes the lower track member 614, upper track member 628, and locking member 644. The seat track system 610 may also include front hook attachment 652, distance plate 654, rivet 656, and locating pin 658. The seat track system 610 includes the forward linkage bracket 660, rearward linkage bracket 662, reinforcement bracket 664, belt buckle bracket 666, and rivets 668. The seat track system 610 includes the cross tube attachment bracket 670, bearing bushing 674, and release mechanism 676. The release mechanism 676 includes the actuation lever 678, handle 680, end cap 682, and cross tube 684.

The seat track system 610 also includes a positive engagement locking mechanism, generally indicated at 686, to lock the upper track member 628 to the locking member 644. The locking mechanism 686 includes a plurality of locking elements such as locking pins 688 extending vertically and through the apertures 650 of the locking member 644. In the embodiment illustrated, four (4) locking pins 688 are used to engage two apertures 650 in the locking member 644. Each locking pin 688 is generally cylindrical in shape and has a frustoconical lower end 690 to engage the apertures 650 in the locking member 644. Each locking pin 688 also has a flange 692 extending radially outwardly a distance spaced from the lower end 690 to act as a spring seat for a spring to be described. Each locking pin 688 is made of a metal material such as steel. Two of the locking pins 688 engage the base portion 646 through the apertures 650 of the locking member 644 for a function to be described. It should be appreciated that a positive locking system provides positive or continuous engagement in any position of the upper track member 628 to the lower track member 614, wherein for any position of the seat, the upper track member 628 is secured to the lower track member 614. It should also be appreciated that in every position of the upper track member 628, one locking pin 688 of the locking system 686 will always fall into one of the apertures 650 of the lower track member 614. It should further be appreciated that the upper track member 628 can only move relative to the lower track member 614 until the locking pin 688 hits the edge of the aperture 650, at that point, the second locking pin 688 engages the locking member 644 and eliminates the free-play.

The locking mechanism 686 also includes a locking pin guide arm 694 to guide the locking pins 688 into engagement with the locking member 644. The locking pin guide arm 694 extends longitudinally and is generally rectangular in shape. The locking pin guide arm 694 extends longitudinally and has a base portion 696 and a pair of side portions 698 extending longitudinally from the sides of the base portion 696. The locking pin guide arm 694 has a plurality of guide apertures 700 extending therethrough and spaced longitudinally for the locking pins 688. As illustrated, the locking pin guide arm 694 has three guide apertures 700, one guide aperture 700 for each locking pin 688. The guide bracket 694 is made of a metal material such as steel. The locking pin guide arm 694 is disposed within the upper track member 628 and secured to the upper track member 628 by a suitable mechanism such as rivets extending through apertures in the side portions 698.

The locking mechanism 686 includes a spring housing 701 disposed on the base portion 630 of the upper track member 628. The spring housing 701 extends longitudinally and is generally rectangular in shape. The spring housing 701 has a plurality of spring cavities 703. As illustrated, the spring housing 701 has three spring cavities 703, one spring cavity 703 for each locking pin 688. The spring housing 701 is made of a metal material such as steel.

The locking mechanism 686 includes a cover plate 704 disposed over the spring housing 701. The cover plate 704 extends longitudinally and is generally rectangular in shape. The cover plate 704 has a main portion 705 and a pair of side portions 706 extending downwardly from the sides of the main portion 705. The cover plate 704 is attached to the spring housing 701 by a suitable mechanism.

The locking mechanism 686 also includes a plurality of pressure springs 712 for the locking pins 688. One pressure spring 712 is disposed over one locking pin 688 and has one end that engages the flange 692 of the locking pin 688 and another end that engages the spring housing 701. The pressure springs 712 are compression springs.

The locking mechanism 686 includes a bearing pin housing 730 disposed over the cover plate 704 and mounted to the upper track member 628. The bearing pin housing 730 extends longitudinally and is generally rectangular in shape. The bearing pin housing 730 has an upper base portion 732 and a pair of side portions 734 extending downwardly from the sides of the base portion 732. The bearing pin housing 730 has a flange portion 736 extending longitudinally from each side portion 734. The flange portion 736 has an aperture 738 extending therethrough. It should be appreciated that the rivets 710 previously described extend through the apertures in the flange portions to secure the bearing pin housing 730 to the upper track member 628.

The locking mechanism 686 includes a distance bushing 740 secured to each of the side portions 734. The locking mechanism 686 includes a bearing bolt 742 extending through the distance bushings 740. The locking mechanism 686 includes a compression spring 722 having a configuration such that one end engages the bearing pin housing 730 and the other end engages an actuation member 714 to be described. It should be appreciated that the bearing bolt 742 is rotatable in the distance bushings 740.

The locking mechanism 686 includes an actuation member 714 such as an unlocking damper to move the locking pins 688. The actuation member 714 includes a plurality of fingers 716 extending outwardly. The fingers 716 are disposed between the locking pins 688 and engage the flanges 692 of the locking pins 688 to move them upwardly against the springs 712. The actuation member 714 has a main portion 718 extending upwardly from the fingers 716. The main portion 718 is pivotally attached to the bearing bolt 742. The actuation member has a flange portion 720 extending outwardly from the main portion 718 to engage the release mechanism 676.

In operation of the seat track system 610, the seat track system 610 is in an engaged position. As illustrated, two of the locking pins 688 engage two of the apertures 650 in the locking member 644. In this position, the locking mechanism 686 provides positive or continuous engagement of the upper track member 628 to the lower track member 614 and the upper track member 628 is secured to the lower track member 614.

To move the seat longitudinally, the release mechanism 676 is operated by an operator grasping the handle 680 and rotating the actuation lever 678 via the cross tube 684. When this occurs, the actuation member 714 is rotated such that the fingers 716 between the locking pins 688 engage the flanges 692 of the locking pins 688 to move them upwardly against the springs 612 to exit the apertures 650 in the locking member 644. The upper track member 628 may then be moved longitudinally relative to the lower track member 614.

Once the seat is moved to a new position, the release mechanism 676 is released by the operator. On the return motion of the actuation lever 678 being released, this return motion causes the actuation member 714 to rotate due to the compression spring 722 such that the fingers 716 between the locking pins 688 disengage the flanges 692 of the locking pins 688 and the springs 712 move the locking pins 688 downwardly. When this occurs, one locking pin 688 will fall into one of the apertures 650 of the lower track member 614 and the second locking pin 688 engages the locking member 644 to secure the upper track member 628 to the lower track member 614.

According to the present invention, another objective is to provide a locking mechanism for a seat track system which can lock up at any arbitrary seat slide position, the play between the locking pins and the lock apertures provided in the locking member being minimal. Such objects are accomplished by providing a locking mechanism for a seat track system having first and second track members which are parallel to each other and mutually slidable, including: a plurality of locking apertures provided in the locking member rigid connected with the first track member, and fixed on the vehicle floor, holes width being Ln and bridges between the holes being Bn, and n (n=2, 3, 4, . . . ) numbers of moveable locking elements (e.g., pins) connected to the second track member arranged at the pitch Bn+Dn on its longitudinal direction; and at least one locking element is provided on the same phase position of the corresponding locking member so to be engageable and releaseable relative to the locking apertures; wherein Bn=(n−1)*Ln−n*Dn, where Dn is the contact diameter belonging to the locking mechanism having n locking elements (pins). Due to the appropriate pitch of the locking apertures and the appropriate diameter of the locking pins at least one of the locking pins can be engaged by the locking apertures of the locking member at any arbitrary seat slide position.

FIGS. 25a through 25c are illustrative views showing the positional relationships between the locking elements such as locking pins 888 and the locking apertures 850 when the number of locking elements is n=2. This relationship can apply on both configurations discussed above: lateral or top attachment of locking elements. The locking apertures 850 on the locking member 844 are arranged at the equal pitch (B2+L2) along the longitudinal axial line thereof, where B2 is the width bridge between two consecutive locking apertures and L2 is the locking member slot width. Meanwhile, the moveable locking elements or pins 888 are provided with a locking pin 888 at a predefined contact diameter D2. The pitch of the locking pins 888 is defined as D2+B2. As a result:

$$D2+B2=L2-D2 \quad (1)$$

or, $$B2=L2-2*D2 \quad (2)$$

Using this embodiment, adjusting pitch of the track members relative to one another is defined as:

$$L2-D2 \quad 3)$$

As illustrated in FIGS. 25a to 25c, after adjusting the seat with one step, a similar relative position of the locking pins 888 relative to the locking apertures 850 from the locking member 844 is achieved. With two locking pins 888 engaged, as shown in FIGS. 25a to 25c, two distinct relative engagement positions are possible, after which the engagement cycle is repeated: locking apertures 850 bridge in between the two locking pins 888, and both locking pins 888 in one locking member 844. Depending on the vehicle impact direction (front or rear), at first only one locking pin 888 will carry the load, the second locking pin 888 is only provided to eliminate the play. After the first load-carry locking pin 888 starts bending, the second locking pin 888 will carry the load also.

FIGS. 26a to 26d illustrate a second embodiment in which three locking elements such as locking pins 888 are engaged in locking apertures 850 of the locking member 844. The pitch of the locking apertures 850 provided on the locking member 844 is defined as L3+B3 since the pitch of moveable locking pins 888 is defined as B3+D3. As a result:

$$2*(L3-D3)+B3+D3=2*(B3+D3) \quad (4)$$

or, $$B3=2*L3-3*D3 \quad (5)$$

For this embodiment, three distinct relative engagement positions are possible, after which the engagement cycle is repeated. For this embodiment, the pitch adjustment value is defined as L3−D3 and will be smaller than L2−D2 if the locking contact diameter D3 has the same size order as D2.

FIGS. 27a to 27e illustrate a third embodiment in which four locking elements such as locking pins 888 are engaged in apertures 850 of the locking member 844. The pitch of the locking apertures 850 provided on the locking member 844 is defined as L4+B4 since the pitch of moveable locking pins 888 is defined as B4+D4. As a result:

$$B4=3*L4-4*D4 \quad (6)$$

To the end of expanding the above described concept to a more general case, it is assumed that there are n moveable locking elements such as locking pins 888 at the same pitch distance (Bn+Dn) from each other, as illustrated in an embodiment shown in FIGS. 28a to 28c. It is also assumed that the pitch of the locking apertures 850 in the locking member 844 is Bn+Ln and the width of each locking aperture 850 is Ln.

In this case, assuming that:

$$Bn=(n-1)*Ln-n*Dn \quad (7)$$

then this relation can be put also as:

$$Ln=Dn+(Bn+Dn)/(n-1) \quad (8)$$

The condition under which the bridge between two neighboring locking apertures 850 can be received by the gap between two neighboring locking pins 888 can be confirmed as follows:

$$Bn+Dn=(n-1)*(Ln+Bn)/n \quad (9)$$

$$Bn=Bn+Dn-Dn=(n-1)*(Ln+Bn)/n-Dn==[(n-1)*Ln \\ (n-1)*Bn-n*Dn]/n=Bn \quad (10)$$

The condition under which the external dimension of n locking pins 888 (n−1)*(Bn+Dn)+Dn can be accommodated within the width (n−2)*(Ln+Bn)+Ln, between the external edges of the locking slots apertures 850, can be also examined and confirmed:

$$(n-2)*(Ln+Bn)+Ln=(n-1)*(Ln+Bn)-(Ln+Bn)+Ln== \\ (n-1)*(Ln+Bn)-Bn=n*(Bn+Dn)-Bn=(n-1)* \\ (Bn+Dn)+Bn+Dn-Bn=(n-1)*(Bn+Dn)+Dn \quad (11)$$

or, $$(n-2)*(Ln+Bn)+Ln=(n-1)*(Bn+Dn)+Dn \quad (12)$$

The above deductions serve also as inputs in an algorithm to determine automatically the necessary kinematical parameters for simulation of pins position for every longitudinal adjustment position of the track members as function of the tracks pitch.

Although the present invention is described in terms of specific embodiments this is not limited thereby. For instance, the present invention includes the cases in which the dimensional relationships between locking apertures provided in the locking member and moveable locking elements such as locking pins are reversed in relation with the above described embodiments.

Figure 29C:
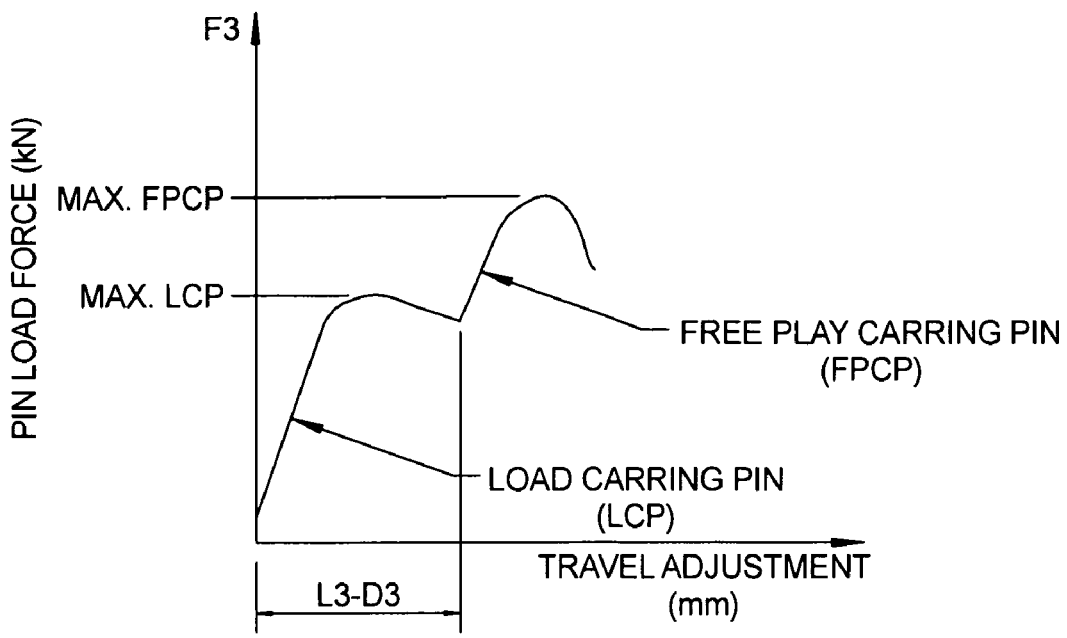
Figure 30C:
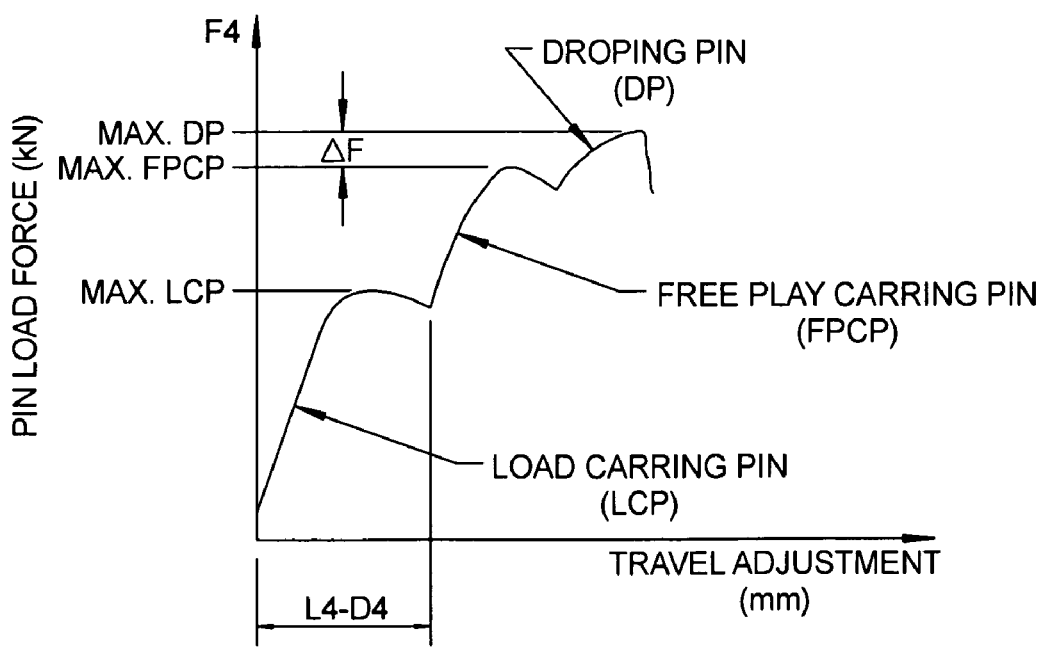

For practical reasons, the locking mechanisms with three or four locking pins are the most used. FIGS. 29a-c illustrate the typical variation of pin load force during the travel adjustment in a case of a frontal impact. The free play carrying pin will take the load also when the load carrying locking pin is bent. As illustrated in FIGS. 30a-c, in the case of a locking mechanism with three locking pins, additional load can be carried out by the locking mechanism due to free play carrying locking pin and dropping locking pin engagement during longitudinal adjustment of the track members.

Figure 31:
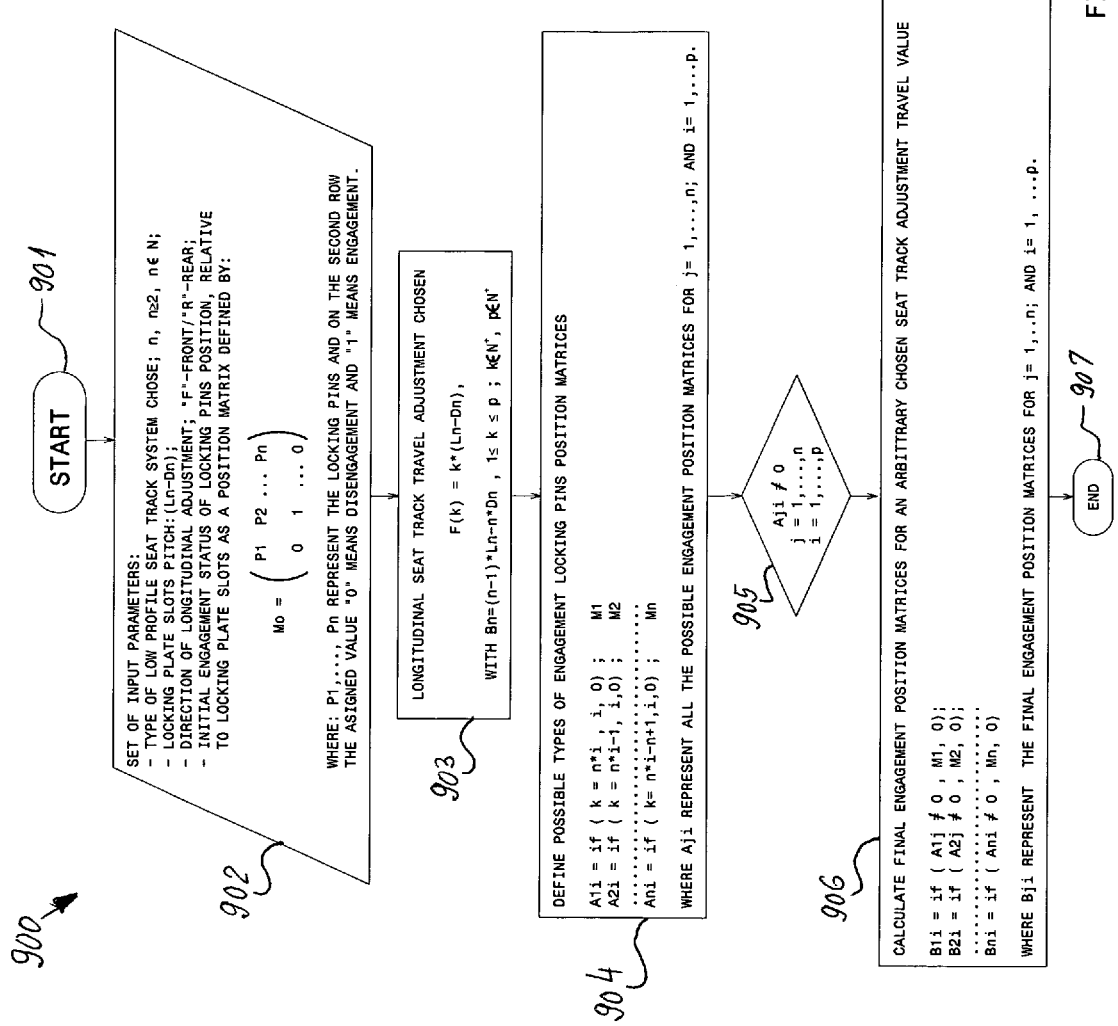
FIG. 31 is a diagrammatic view of an algorithm that provides enhanced computational efficiency in determining automatically the exact position of each locking pin relative to locking member slots (engaged/disengaged), for every longitudinal adjustment of the seat, as function of seat tracks integer pitch, for a certain low profile seat track system adopted.

Referring to FIG. 31, a method, according to the present invention and generally shown at 900, for automatic determination of position of each locking pin relative to the locking member slot (engaged/disengaged), for a general locking system having n locking pins is illustrated. The method allows for an enhanced computational efficiency in determining the locking pins position relative to the locking member for every longitudinal adjustment, as a function of track integer pitch.

The method 900 starts at 901 and advances to an interface module 902 that allows introduction of a set of specific parameters for a particular type of low seat track system. The method 900 then advances to module 903 that allows definition of a particular longitudinal seat track travel adjustment as a function of integer pitch of the seat track, with the bridge between the locking plate slots defined as Bn=(n−1)*Ln−n*Dn. For a particular low seat track system adopted, the method 900 advances to module 904 that allows definition of all possible positions, of those n pins relative to locking plate hole slots, as particular two rows and n columns matrices M1, ..., Mn. The method 900 then advances to the next module 905 that allows for verifying the exact nature of a particular adjustment, as an integer of seat track system travel pitch. Finally, the method 900 advances to module 906 that determines the unique sought arrangement locking pins-locking slots, as a matrix-element of one row of matrices Bji. The method 900 then ends at 907. It should be appreciated that, for a certain particular travel adjustment, the method provides a very fast and intuitive visual output, required in various kinematical simulations performed during the design of specific low profile seat track system.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat track system for a seat of a vehicle comprising:
at least one seat track having a lower track member adapted to be fixed to a vehicle structure and an upper track member adapted to be connected to a seat and moveable relative to the lower track member;
a locking member disposed in said lower track member, said locking member having a plurality of apertures extending therethrough;
a plurality of movable locking elements, said locking elements being non-rotatable and movable axially, at least two of said locking elements extending into said apertures of said locking member such that said locking elements do not extend through said lower track member;
a plurality of springs, one of said springs disposed about one of said locking elements and cooperating with said locking member to urge said locking elements toward said lower track member; and
an adjustable locking mechanism connected to said upper track member and engagable with said locking elements to assist in the axial movement of said locking elements to allow said upper track member to be moved relative to said lower track member.

2. A seat track system as set forth in claim 1 wherein said locking apertures are spaced longitudinally to receive said locking elements.

3. A seat track system as set forth in claim 2 wherein said locking elements comprise a plurality of locking pins extending vertically and having a lower end to engage said locking apertures in said locking member.

4. A seat track system as set forth in claim 3 wherein said locking mechanism includes a guide bracket to guide said locking pins into engagement with said locking member.

5. A seat track system as set forth in claim 3 wherein said locking mechanism includes an actuation member to move said locking pins.

6. A seat track system as set forth in claim 5 wherein said actuation member includes a plurality of fingers extending outwardly and disposed between said locking pins to engage said locking pins to move said locking pins upwardly against said springs.

7. A seat track system as set forth in claim 6 wherein said locking mechanism includes a wire spring for urging said fingers in a non-engaged position with said locking pins.

8. A seat track system as set forth in claim 6 wherein said locking mechanism includes a cover plate having a plurality of apertures extending therethrough and corresponding to the number of said locking pins.

9. A seat track system as set forth in claim 8 wherein said locking mechanism includes a spacer disposed on said upper track member and having a plurality of guide apertures extending therethrough and spaced longitudinally for said locking pins.

10. A low profile seat track system as set forth in claim 8 wherein said upper track member has a vertical height from an outer surface of a base portion thereof to an outer surface of a base portion of said lower track member of approximately 30 millimeters.

11. A low profile seat track system for a seat of a vehicle comprising:
a lower track member adapted to be fixed to vehicle structure;
an upper track member adapted to be connected to a seat and moveable relative to said lower track member;
said lower track member having a generally U shape with flanges extending downwardly;
a locking member disposed in said lower track member, said locking member having an upper base portion and side portions extending downwardly from said base portion to form a generally hollow interior and a plurality of apertures extending through said upper base portion and communicating with said hollow interior; and
said upper track member having a generally U shape with flanges extending upwardly such that said flanges of said lower track member overlap said flanges of said upper track member to give said seat track system a vertical height less than 30 millimeters.

12. A low profile seat track system as set forth in claim 11 wherein said upper and lower track members have a predetermined wall thickness of approximately 1.8-2.0 millimeters.

13. A low profile seat track system as set forth in claim 12 wherein said lower track member has a vertical height from an outer surface of a base portion thereof to an outer surface of an upper flange thereof of approximately 19 millimeters.

14. A seat track system for a seat of a vehicle comprising:
at least one seat track having a lower track member adapted to be fixed to a vehicle structure and an upper track member adapted to be connected to a seat and moveable relative to said lower track member;
a manual positive engagement locking system cooperating with said at least one seat track to allow longitudinal adjustment of said upper track member relative to said lower track member and to positively engage said at least one seat track; and
a locking member disposed in said lower track member, said locking member having an upper base portion and side portions extending downwardly from said upper base portion to form a generally hollow interior and a plurality of apertures extending through said base portion and communicating with said hollow interior; and
a plurality of movable locking elements for extending through said apertures and into said hollow interior of said locking member such that said locking elements do not extend through said lower track member.

15. A seat track system as set forth in claim 14 wherein said locking elements comprise a plurality of locking pins extending vertically and having a lower end to engage said locking apertures in said locking member.

16. A seat track system as set forth in claim 15 including a plurality of springs, one of said springs disposed around one of said locking pins and cooperating with said locking member to urge said locking pins toward said lower track member.

17. A seat track system as set forth in claim 16 wherein said manual positive engagement locking system includes an actuation member engagable with said locking pins to move said locking pins.

18. A seat track system as set forth in claim 17 wherein said manual positive engagement locking system, for the most case, has the pitch defined as $(Bn \div Dn)$ and the width bridge between two consecutive slots Bn define as $Bn=(n-1)*Ln-n*Dn$, where n is the number of locking pins of the locking mechanism, Ln is the locking plate slot width, and Dn is the contact diameter of the locking mechanism.

* * * * *

UNITED STATES PATENT AND TRADEMARK OFFICE
CERTIFICATE OF CORRECTION

PATENT NO. : 8,382,057 B2
APPLICATION NO. : 12/798205
DATED : February 26, 2013
INVENTOR(S) : Mircea Napau et al.

It is certified that error appears in the above-identified patent and that said Letters Patent is hereby corrected as shown below:

In the Claims

Column 16, line 46 delete "about" and insert therefor --around--

Column 17, line 33 insert therefor --upper-- between "said" and "base"

Column 18, line 19 insert therefor --upper-- between "said" and "base"

Signed and Sealed this
Twenty-eighth Day of May, 2013

Teresa Stanek Rea
*Acting Director of the United States Patent and Trademark Office*